(12) United States Patent
Amato

(10) Patent No.: US 12,699,954 B2
(45) Date of Patent: *Aug. 4, 2026

(54) DIGITALLY INFORMED DELIVERY WITH CUSTOM ELECTRONIC SUPPLEMENTS FOR HARDCOPY MAIL

(71) Applicant: United States Postal Service, Washington, DC (US)

(72) Inventor: Michael J. Amato, Ocean Isle Beach, NC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,895

(22) Filed: Jan. 17, 2025

(65) Prior Publication Data

US 2025/0165917 A1 May 22, 2025

Related U.S. Application Data

(63) Continuation of application No. 18/490,388, filed on Oct. 19, 2023, now Pat. No. 12,205,071, which is a
(Continued)

(51) Int. Cl.
*G06Q 10/083* (2024.01)
*G06F 16/955* (2019.01)
(Continued)

(52) U.S. Cl.
CPC ..... *G06Q 10/0838* (2013.01); *H04N 1/00222* (2013.01); *G06F 16/955* (2019.01);
(Continued)

(58) Field of Classification Search
CPC ............. G06Q 10/0838; G06Q 10/083; G06Q 10/087; G06Q 10/0841; G06Q 10/0843;
(Continued)

(56) References Cited

U.S. PATENT DOCUMENTS 6,889,213 B1   5/2005   Douvikas et al.
9,105,016 B2   8/2015   Briggman et al.
(Continued)

FOREIGN PATENT DOCUMENTS

AU     2007100173 A4   4/2007
WO     2005120856 A2   12/2005
(Continued)

OTHER PUBLICATIONS

Olson et al. "Remember, You Can Complete This Survey Online! Web Survey Links and QR Codes in a Mixed-Mode Web and Mail General Population Survey". Social Science Computer Review (2024): 1-23; doi: 10.1177/08944393241277553. https://digitalcommons. unl.edu/sociologyfacpub/863/ (Year: 2024).*
(Continued)

*Primary Examiner* — Shannon S Campbell
*Assistant Examiner* — Lisa Ma
(74) *Attorney, Agent, or Firm* — MH2 Technology Law Group, LLP

(57) ABSTRACT

Systems and methods for digitally accompanied delivery of delivery items, such as mail or packages. A delivery item has supporting digital data, such as electronic text, a digital file, an image, a web page(s), or the like. The delivery item includes an indicia, such as a bar code, that provides access to, or references, the digital resource. When the delivery item is processed during transit from the sender to the recipient of the delivery item, the indicia is scanned, read, and/or decoded, and the supporting digital data is identified therefrom. The delivery service transmits, to the recipient, an electronic notification indicating or including at least part of the supporting digital data. The notification may include information about the enroute status of the delivery item. The recipient may access the delivery item's supporting
(Continued)

digital data, e.g., as included directly in the notification or via a link provided with the notification, etc.

20 Claims, 5 Drawing Sheets

Related U.S. Application Data continuation of application No. 17/961,660, filed on Oct. 7, 2022, now Pat. No. 11,797,917, which is a continuation of application No. 16/416,194, filed on May 18, 2019, now Pat. No. 11,468,399.

(60) Provisional application No. 62/673,549, filed on May 18, 2018.

(51) Int. Cl.
| | |
|---|---|
| *H04N 1/00* | (2006.01) |
| *H04N 1/32* | (2006.01) |
| *H04W 4/14* | (2009.01) |

(52) U.S. Cl.
CPC ..... *H04N 1/32128* (2013.01); *H04N 1/32144* (2013.01); *H04W 4/14* (2013.01)

(58) Field of Classification Search
CPC ......... G06Q 10/08365; G06Q 30/0633; G06Q 30/0635; G06Q 50/40; G06Q 50/60; H04N 1/00222; H04N 1/32128; H04N 1/32144; G06F 16/955; H04W 4/14
USPC ....................................................... 705/341
See application file for complete search history.

(56) References Cited

U.S. PATENT DOCUMENTS

| | | | | |
|---|---|---|---|---|
| 9,855,785 | B1 * | 1/2018 | Nagelberg | ....... G06K 19/06028 |
| 9,996,813 | B2 | 6/2018 | Briggman et al. | |
| 10,325,240 | B2 | 6/2019 | Briggman et al. | |
| 10,565,542 | B2 | 2/2020 | Briggman et al. | |
| 10,671,963 | B2 | 6/2020 | Briggman et al. | |
| 2003/0061176 | A1 * | 3/2003 | Hoar | ................... G06Q 10/107 |
| | | | | 705/402 |
| 2003/0144973 | A1 * | 7/2003 | Pintsov | .............. G07B 17/0008 |
| | | | | 705/402 |
| 2007/0208618 | A1 | 9/2007 | Paintin et al. | |
| 2012/0011068 | A1 | 1/2012 | Dearing et al. | |
| 2012/0179769 | A1 | 7/2012 | Amato | |
| 2013/0226740 | A1 * | 8/2013 | Biliosa | .............. G06Q 30/0621 |
| | | | | 705/26.1 |
| 2015/0129654 | A1 * | 5/2015 | Janakiraman | ........ G06Q 10/083 |
| | | | | 235/375 |
| 2015/0324743 | A1 * | 11/2015 | Briggman | ............. H04L 51/234 |
| | | | | 705/333 |
| 2015/0332380 | A1 | 11/2015 | Strzalka et al. | |

| | | | | |
|---|---|---|---|---|
| 2016/0034975 | A1 * | 2/2016 | Cameron | ............... A21D 13/48 |
| | | | | 705/15 |
| 2017/0195268 | A1 * | 7/2017 | Nair | ...................... H04L 51/066 |
| 2018/0075154 | A1 * | 3/2018 | Broselow | .............. H04L 63/083 |
| 2018/0089623 | A1 * | 3/2018 | Walsh | .................. G06V 30/416 |
| 2019/0303855 | A1 | 10/2019 | Briggman et al. | |
| 2019/0354931 | A1 | 11/2019 | Amato | |
| 2023/0041705 | A1 | 2/2023 | Amato | |
| 2024/0046198 | A1 | 2/2024 | Amato | |

FOREIGN PATENT DOCUMENTS

| | | | | |
|---|---|---|---|---|
| WO | | 2012051125 A2 | 4/2012 | |
| WO | WO-2015012827 A1 * | | 1/2015 | ......... G06K 7/10722 |

OTHER PUBLICATIONS

Chen, Daniel, "7 Major Things You Need to Know About an Invoice", http://web.archive.org/web/20170225104936/http://info.kickfurther.com/7-major-things-you-need-to-know-about-an-invoice. Web archived on Feb. 25, 2017. (Year: 2017).

Endres et al., "The Effect of Quick Response (QR) Codes on Response Rates and Respondent Composition: Results from a Statewide Experiment", Survey Methods: Insights From the Field, vol. 2, Issue 2, retrieved from https://surveyinsights.org/?p=19389 (Year: 2024), 9 pages.

Notice of Allowance issued in U.S. Appl. No. 16/416,194 on Jun. 6, 2022, 15 pages.

US Office Action issued in U.S. Appl. No. 16/416,194 on Mar. 9, 2021, 45 pages.

US Office Action issued in U.S. Appl. No. 16/416,194 on Feb. 14, 2022, 9 pages.

US Office Action issued in U.S. Appl. No. 16/416,194 on Mar. 20, 2020, 44 pages.

US Office Action issued in U.S. Appl. No. 16/416,194 on Nov. 20, 2020, 38 pages.

US Office Action issued in U.S. Appl. No. 16/416,194 on Jul. 21, 2020, 37 pages.

US Office Action issued in U.S. Appl. No. 16/416,194 on Sep. 29, 2021, 40 pages.

US Office Action issued in U.S. Appl. No. 17/961,660 on Feb. 1, 2023, 33 pages.

International Search Report and Written Opinion issued in International Application No. PCT/US19/33017 on Jul. 25, 2019, pp. 1-10.

Virupaksh et al., "QR Code as a Delivery Tool", http://www.ijim.in/wp-content/uploads/2017/08Nol-2-Issue-III-124-129-paper-19-Virupaksh-Mahant-Patil-QR-Code-as-a-Delivery-Tool-for-Marketing-Library-Products-and-its-Services-A-Case-Study-of-TCS-IRCs-1.pdf (Year: 2017).

International Preliminary Report on Patentability issued in International Application No. PCT/US2019/033017 on Nov. 24, 2020, (8 pages).

Office Action issued in U.S. Appl. No. 18/490,388 on May 23, 2024, 41 pages.

Notice of Allowance issued in U.S. Appl. No. 18/490,388 on Sep. 16, 2024, 11 pages.

* cited by examiner

FIG. 1    Exemplary Digital Processing and Communications System

Exemplary System for Digitally Informed Delivery

FIG. 3   Exemplary Method for Digitally Informed Delivery

300

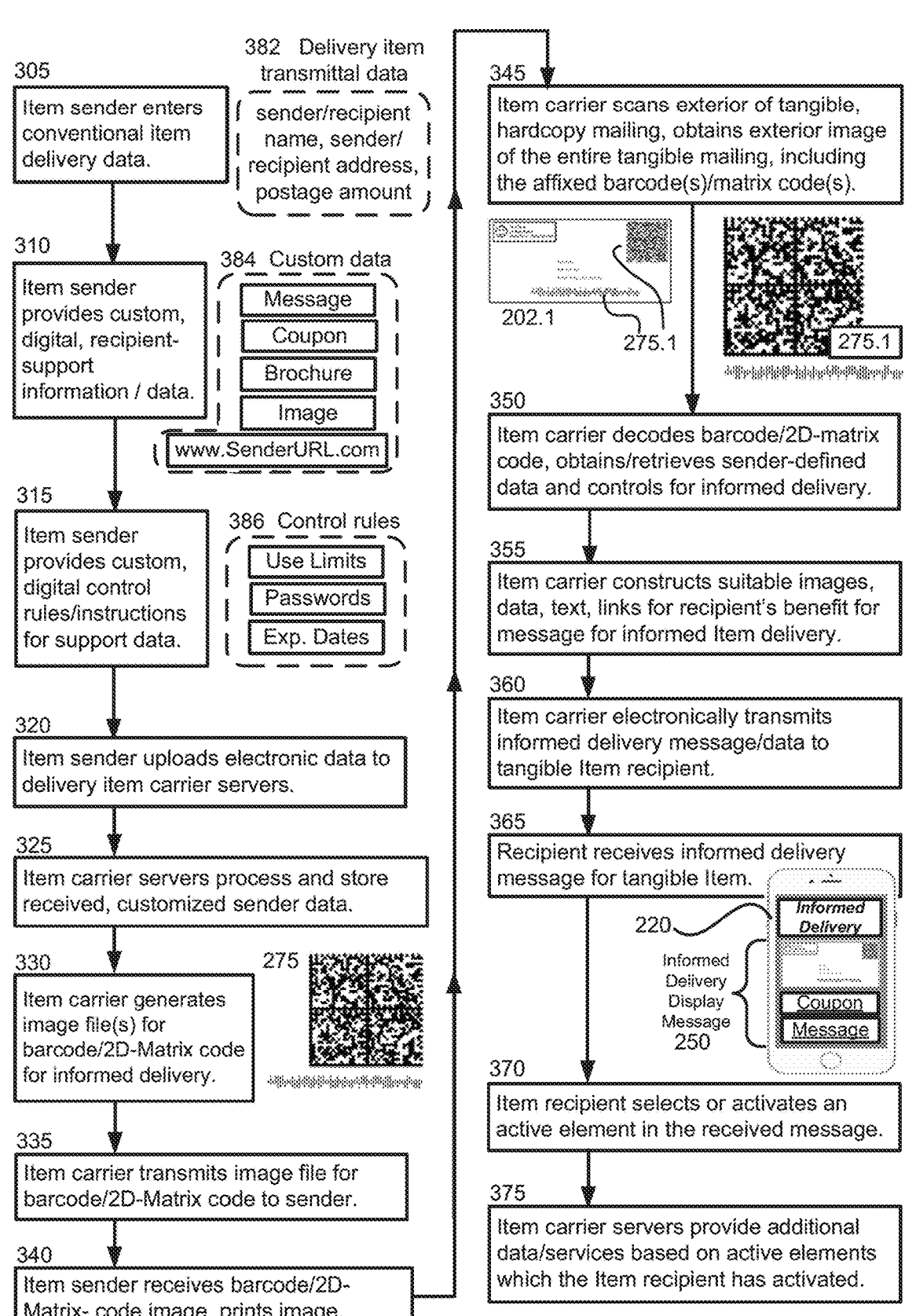

305
Item sender enters conventional item delivery data.

382   Delivery item transmittal data
sender/recipient name, sender/ recipient address, postage amount

310
Item sender provides custom, digital, recipient-support information / data.

384   Custom data
Message
Coupon
Brochure
Image
www.SenderURL.com

315
Item sender provides custom, digital control rules/instructions for support data.

386   Control rules
Use Limits
Passwords
Exp. Dates

320
Item sender uploads electronic data to delivery item carrier servers.

325
Item carrier servers process and store received, customized sender data.

330
Item carrier generates image file(s) for barcode/2D-Matrix code for informed delivery.

275

335
Item carrier transmits image file for barcode/2D-Matrix code to sender.

340
Item sender receives barcode/2D-Matrix- code image, prints image.

345
Item carrier scans exterior of tangible, hardcopy mailing, obtains exterior image of the entire tangible mailing, including the affixed barcode(s)/matrix code(s).

202.1     275.1     275.1

350
Item carrier decodes barcode/2D-matrix code, obtains/retrieves sender-defined data and controls for informed delivery.

355
Item carrier constructs suitable images, data, text, links for recipient's benefit for message for informed Item delivery.

360
Item carrier electronically transmits informed delivery message/data to tangible Item recipient.

365
Recipient receives informed delivery message for tangible Item.

220
Informed Delivery Display Message 250
Informed Delivery
Coupon
Message

370
Item recipient selects or activates an active element in the received message.

375
Item carrier servers provide additional data/services based on active elements which the Item recipient has activated.

DIGITALLY INFORMED DELIVERY WITH CUSTOM ELECTRONIC SUPPLEMENTS FOR HARDCOPY MAIL

CROSS-REFERENCE TO RELATED APPLICATIONS

This application is a continuation of U.S. patent application Ser. No. 18/490,388 filed on 19 Oct. 2023, (now allowed), which is a continuation of U.S. patent application Ser. No. 17/961,660 filed on 7 Oct. 2022, (now U.S. Pat. No. 11,797,917), which is a continuation of U.S. patent application Ser. No. 16/416,194 filed on 18 May 2019, (now U.S. Pat. No. 11,468,399), which claims the benefit and priority of U.S. Provisional Patent Application No. 62/673,549 filed on 18 May 2018, all of which are hereby incorporated by reference in their entireties.

FIELD OF THE INVENTION

This disclosure is generally directed to systems and methods for electronic data processing and communications systems which supplement the delivery of hardcopy, physically tangible delivery items, for example delivery items or postal mailings such as printed letters, printed brochures, and packaged items. More specifically, the disclosure relates to systems and methods to provide electronic notifications to the end-recipient, via e-mail or electronic text messaging or similar, that a delivery item (e.g., hardcopy mail) is enroute; and further to enhancing the notifications with additional information which is customized by the sender of the physical delivery item.

BACKGROUND

The past two decades have seen a dramatic increase in the use of electronic communications—such as e-mail, web pages, and file-sharing—to replace or supplant physical, hard-copy delivery items such as printed letters, printed brochures and publications, packaged goods, and in general items that are delivered by services such as the U.S. Postal Service (USPS), Federal Express (FedEx) corporation, United Parcel Service (UPS) corporation, and the like. At the same time, transportation of information and products (such as purchased products) as tangible, physical items for home or office delivery, remains an essential part of our communications infrastructure.

In spite of the increased importance of electronic communications, and because physical mail still plays an important role, digital tools have been developed to allow users to track both physical and digital aspects of communication. Such tools may also add additional value to traditional mail (that is, hardcopy, tangible mail, printed matter, or tangible items and deliverable products) by supplementing the physical item delivery with added digital features.

Note that, herein, the term "mail" may sometimes be employed interchangeably with "delivery item"; as used herein, "mail" may also refer in an exemplary sense to U.S. Postal Mail, and may also refer generically to delivery items delivered by any delivery service, government or private, including for example and without limitation the United States Postal Service (USPS), the United Parcel Service (UPS), and Federal Express (FedEx). The terms "tangible mail," "item of tangible mail," "delivery item," "tangible item," and simply "item" are used interchangeably herein, referring generically to deliverable printed matter, packages, and packaged materials transported by delivery services (government or private).

Digitization has also been increasingly employed in the processing and handling of physical mail itself by carriers such as the USPS, UPS, and FedEx. For example, delivery item envelopes and packaging (such as delivery boxes) have traditionally employed printed addressing (which may be typed or handwritten), along with postage stamps or other postage or payment indicia to indicate the delivery item transmittal costs (e.g., mailing costs) have been paid. Written addressing (hand written or printed) is still employed for the convenience of human beings who send, carry, and receive physical mail; however, other payment indicia such as barcode patterns are often now employed on item delivery envelopes as well. The barcodes can encode addresses, postage paid information, class of mail, delivery item weight, and other information suitable for machine processing.

To further enhance the use of traditional, tangible item deliveries, it is desirable to conveniently, efficiently link together the delivery of (i) hardcopy mail and (ii) electronic information, sent from a common sender to one or more recipients (also known as "addressees").

The United States Postal Service (USPS) currently offers to residential customers a service called Informed Delivery. Informed Delivery provides eligible residential consumers with a digital preview of their household's incoming mail that is scheduled to arrive soon (only for letter-sized mail pieces that are processed through the USPS's automated sorting equipment). Users can view grayscale or color images of the exterior, address side of incoming letter-sized mail pieces via email or an online dashboard. The Informed Delivery service can be provided via desktop computer, tablet, or cell phone.

It may be further desirable that the sender of a mail piece be able to provide customized, linked electronic information in ways suitable for specific recipients. For example, a sender of mail may be a product vendor or service provider seeking to digitally provide product literature, marketing literature, coupons, support information, or other information to accompany the hardcopy delivery item transmittal. It is further desirable that the recipient be conveniently informed that the hardcopy item deliveries and electronic information are both from a common sender and are linked or associated.

Such linkages, and suitable informing of recipients, may be achieved in a variety of ways. This and other objects may be achieved by systems and methods described further according to embodiments of the disclosure as described herein.

SUMMARY

Such linkages, and suitable informing of recipients, may be achieved in a variety of ways. This and other objects may be achieved by systems and methods described further according to embodiments of the disclosure as described herein.

In one aspect, disclosed herein is a system for providing, to a recipient, digital data associated with a tangible delivery item that is sent from a sender. The system may include a processor(s); and a memory that is operatively coupled to the processor. The memory may be configured to store data that includes conventional delivery item data comprising sender identification data for the tangible delivery item and recipient identification data for the tangible delivery item;

and supporting digital data (SDD) that is distinct from the conventional delivery item data and that is lacking information identifying the recipient.

The processor may be configured to perform operations including: generating an image of an indicia that is configured for application to an exterior of the tangible delivery item, where the indicia includes data comprising at least a portion of the conventional delivery item data; and at least a portion of the additional information. The processor may be configured to also perform operations including: receiving an image of the exterior of the tangible delivery item during sorting, the image including the indicia; decoding the indicia to obtain the at least a portion of the conventional delivery item data and the at least a portion of the additional information; and sending, to a processing device of the recipient, a digital message comprising the at least a portion of the additional information.

In another aspect, the additional information includes text data. In another aspect, the additional information includes at least one of: a link enabling digital access from an electronic device; a universal resource locator (URL); an image; a data file; an index indicative of at least a portion of the SDD uploaded by the sender; an identifier indicating a type of data in the SDD; or an identifier indicating a type of service associated with the SDD.

In another aspect, the processor is further configured to perform operations including receiving the conventional delivery item data and the SDD via an electronic transmission from an electronic device of the sender.

In another aspect, the processor is further configured to perform operations including receiving a control rule from the sender.

In another aspect, the processor is further configured to perform operations including receiving a digital request from an electronic device of the recipient, the digital request comprising a request for access to data associated with the SDD; and providing, to the electronic device of the recipient, the requested access. In a further aspect, the operations also include providing the requested access according to a control rule received from the sender.

In another aspect, disclosed herein is a computer-implemented method for providing digital data associated with a tangible delivery item that is sent from a sender to a recipient. The method may include receiving, from a processing device of the sender: conventional delivery item data comprising sender identification data for the tangible delivery item, and recipient identification data for the tangible delivery item; and supporting digital data (SDD) that is distinct from the conventional delivery item data and that is lacking information identifying the recipient. The method may further include generating an image of an indicia that is configured for application to an exterior of the tangible delivery item, where the indicia includes data comprising at least a portion of the conventional delivery item data; and SDD-related data corresponding to the SDD. The method may further include receiving an image of the exterior of the tangible delivery item during sorting, wherein the image includes the indicia; decoding the scanned image to obtain the at least a portion conventional delivery item data and the SDD-related data; and sending, to a processing device of the recipient, a digital message comprising the SDD-related data.

In another aspect, the SDD-related data corresponding to the SDD may include at least one of: the full contents of the SDD; text data from the SDD; an image from the SDD; a link enabling access from an electronic device of the recipient to a storage location of the SDD-related data; an index indicative of at least a portion of the SDD-related data; an identifier indicating a type of data in the SDD-related data; or an identifier indicating a type of service associated with the SDD-related data.

In another aspect, the method may further include storing a data element of the SDD, where the data element includes at least one of: all the data of the SDD; text for reading by the recipient; an audio message for hearing by the recipient; a graphic for electronic viewing by the recipient; an executable program for execution by an electronic device of the recipient; an electronic document for access by the recipient; or a link to a remote digital resource for access by the recipient.

In another aspect, the method may further include receiving, from the processing device of the sender, a control rule comprising a use count indicating a number of permitted uses of the SDD-related data by the recipient.

In another aspect, the method may further include receiving a digital request from an electronic device of the recipient, the digital request comprising a request for access to the SDD-related data; and providing, to the electronic device of the recipient, the requested access to the SDD-related data.

In another aspect, the method may further include limiting access by the recipient to the SDD-related data according to a data control rule received from the sender.

In another aspect, disclosed herein is another system for providing digital data associated with a tangible delivery item that is sent from a sender to a recipient. The system may include a processor(s); and an interface that is operatively coupled to the processor. The interface may be configured to receive, from the sender, data that includes conventional delivery item transmittal data comprising sender identification data for the tangible delivery item and recipient identification data for the tangible delivery item; and supporting digital data (SDD) that is distinct from the conventional delivery item transmittal data and that is lacking information identifying the recipient.

The processor may be configured to perform operations including transmitting, to a processing device of a delivery service, the conventional delivery item transmittal data and SDD-related data, wherein the delivery service is configured to associate the tangible delivery item with the SDD and to inform the recipient about the SDD based on the SDD-related data; generating an image of an indicia, (where the indicia includes encoded data comprising the conventional delivery item transmittal data; and the SDD-related data); and providing the image of the indicia for application to an exterior surface of the tangible delivery item. The image of the indicia may be configured to be imaged during sorting of the tangible delivery item.

In another aspect, the SDD-related data may include at least one of: the full contents of the SDD; text data from the SDD; a digital file from the SDD; a link enabling digital access from an electronic device of the recipient to a storage location of the SDD; an index indicative of at least a portion of the SDD; an identifier indicating a type of data in the SDD; or an identifier indicating a type of service associated with the SDD.

In another aspect, the SDD may include at least one of: text for reading by the recipient; an audio message for hearing by the recipient; a graphic for electronic viewing by the recipient; an executable program for execution by an electronic device of the recipient; an electronic document for access by the recipient; or a link to a remote digital resource for access by the recipient.

In another aspect, the processor may be further configured to perform operations that include: storing the SDD in a memory; and enabling the recipient to access the SDD. In a further aspect, the processor may be further configured to perform operations that include at least one of: transmitting to the processing device of the delivery service a link to the stored SDD; or including in the indicia a link to the stored SDD.

In another aspect, the interface may be configured to receive, from the sender, data comprising a control rule that includes a limitation on the use of the SDD by the recipient.

In another aspect, the number of uses of the SDD by the recipient may limited according to the control rule.

In another aspect, the present disclosure embraces methods which may be implemented in a processing device by hardware controlled by suitable software or firmware, the methods being substantially in accordance with the descriptions provided above for hardware and software embodiments of the present system and method.

The foregoing illustrative summary, as well as other exemplary objectives and/or advantages of the invention, and the manner in which the same are accomplished, as well as additional or alternative features or embodiments, are further explained within the following detailed description and its accompanying drawings.

BRIEF DESCRIPTION OF THE DRAWINGS

FIG. 2 depicts some elements of an exemplary distributed system for digitally informed delivery of physical, tangible delivery items.

FIG. 3 illustrates, both in flow chart form and via illustration of exemplary data elements and/or exemplary printed matter elements, an exemplary method for enhanced digitally informed delivery of physical, tangible delivery items.

DETAILED DESCRIPTION

Figure 1:
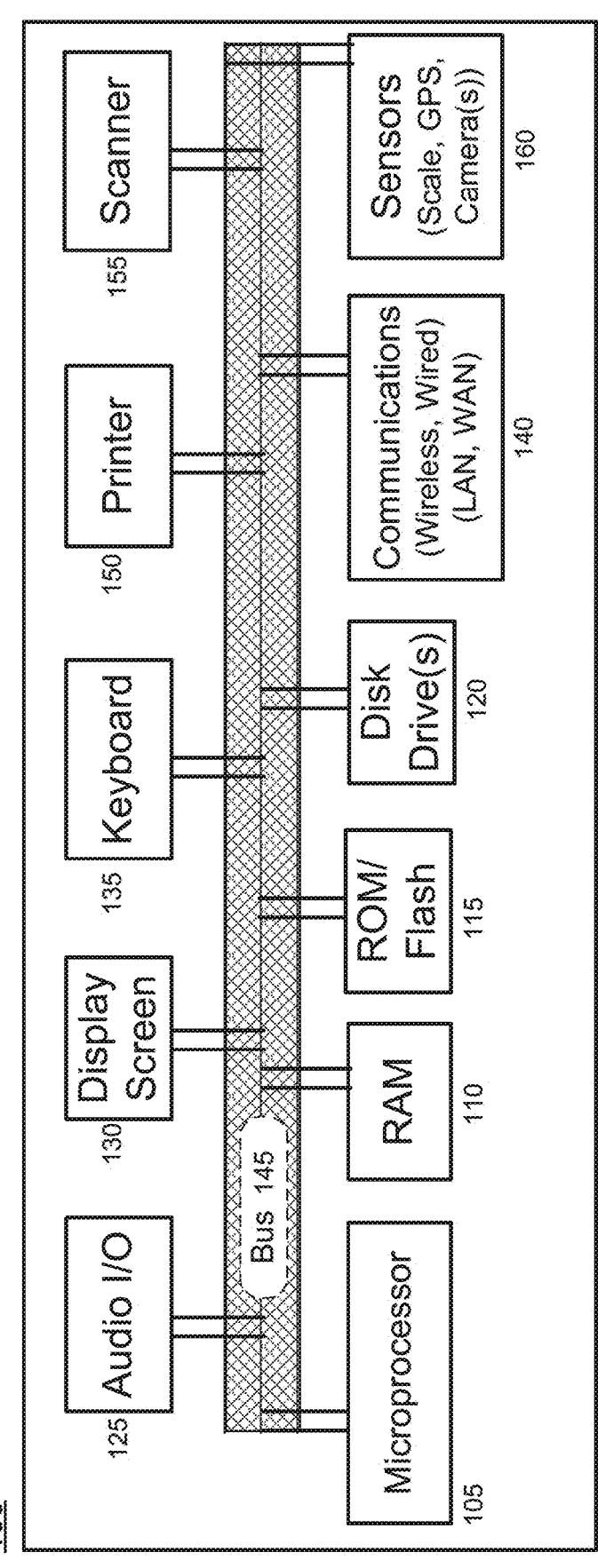
FIG. 1 schematically depicts some elements of an exemplary digital processing system which may be used for data processing, digital communications, and related purposes.

In the following description, certain specific details are set forth in order to provide a thorough understanding of various embodiments. However, one skilled in the art will understand that the invention may be practiced without these details. In other instances, well-known structures associated with computers, with printers, wired or wireless communications, with other digital devices, with data display, and/or with data storage or data transmission, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret or limit the scope or meaning of the claimed invention.

Reference Numbers: Reference numbers are used throughout the figures, and the first digit of a reference number generally indicates the first drawing where the associated element appears. For example, an element 207 first appears in FIG. 2.

In some instances, an element may be shown in both a generic form and a more specific form or species; in these cases, the specific form or species may be indicated by an appended period (".") followed by a digit or digits to distinguish a species of the general form.

Bar Codes and Matrix Codes: It will be noted that the bar codes and matrix codes shown in the figures are exemplary only and are not meant to be limiting. Any suitable bar codes or matrix codes, including those currently in use for item delivery applications; bar codes and matrix codes in general use but not currently employed for item delivery labeling; and bar codes and matrix codes to be developed may be employed to encode the information described further herein, below.

Terms

Delivery Item: As used in this document, a delivery item 202 or tangible delivery item 202 generally refers to a portable, usually hand-deliverable physical item with a container or wrapper around it, the container or wrapper having imprinted on it (or otherwise conveying) necessary information for conveyance of the physical item from a sender to a recipient. In some instances the exterior wrapping may be omitted, as for example with a postcard or a brochure with suitable tape to close the brochure, where the card or sealed brochure itself is the physical item and has suitable labeling directly imprinted or attached.

The physical item may include for example and without limitation paper or papers, printed matter, or various tangible products or items to be physically transported from an item sender to an item recipient via an item delivery service, often entailing hand transport and delivery along at least part of the route. For example without limitation, any of a letter, a document, a cell phone, a child's toy, or a diamond ring, suitably contained or wrapped and labeled for transport, would all be examples of delivery items.

The term delivery item 202 also typically encompasses printed matter or other indicia 275 (for example, postal stamps of the U.S. Postal Service or other national postal services, or bar codes employed by both postal services and private delivery companies) which may indicate, among other elements, payment of tangible item transport costs, as discussed further immediately below.

Indicia, Transmittal Indicia, Payment Indicia, Digital Indicia, and Similar

Terms: As used in this document, the term payment indicia 275, transmittal indicia 275, tangible item indicia 275, digital indicia 275, or sometimes simply indicia 275, refers to a marking, stamp, indicator, printed symbol, or printed data 275, generally affixed to, printed on, displayed on, or visible on the exterior envelope, box, or container of a delivery item, and which may indicate the costs of mailing;

but may also indicate additional information including but not limited to sender address, recipient address, and other data.

As discussed further below, in embodiments, it is among the purposes, methods, and results of the present system and method to enhance the information which may be stored in and conveyed via the payment indicia 275; consequently, a "payment indicia" is in no way limited to conveying only payment information and in no way limited to conveying only "postage" as that term is historically understood. Payment indicia 275 may specifically include sender/recipient data 382, custom data 384, and control rules 386 (see FIG. 3 below), as described herein further below, as well as other information, textual or encoded.

In an embodiment of the present system and method, two or more indicia 275 may be employed, only one of which or only some of which include payment information, the remaining indicia 275 conveying instead other information.

Persons skilled in the relevant arts will therefore appreciate that the phrase "payment indicia" (and in particular the word "payment") is used for convenience and by virtue of historical convention, and is not limited to indicia or indication of payment only, and is not limiting. For example, other terms, such as "transmittal indicia 275" or "transport indicia 275" could be employed as well, and could encompass either or both of payment information and many other forms of information.

Persons skilled in the relevant arts will also appreciate that while the use of indicia which are partly or wholly digital (such as bar codes) is increasingly common in contemporary use, the term "digital indicia" as used herein is broadly equivalent with other payment indicia (such as U.S. postage stamps) which may have no digital elements.

Postage: Where the term postage may be employed herein, it will be understood as exemplary in reference to payment indicia issued by the U.S. Postal Service and other government postal services, but shall serve to also generally encompass other payment indicia from private companies and delivery service; and the term postage (and related terms, such as "postage stamp", "digital stamp," or simply "stamp" are understood to include forms of indicia such as bar codes.

Delivery Service: A delivery service is any organization, governmental or private, which transports tangible items 202 from a specific sender to a specified recipient. Such delivery services include for example and without limitation the U.S. Postal Service, other national postal services, UPS, and FedEx, as already enumerated above. Any references herein to the United States Postal Service will therefore be understood as exemplary only, and not limiting.

Postage Meter or Postal Meter: A postal meter 206 is any device which may be used, among other purposes, to weigh and/or determine a size of a tangible item 202 for item delivery, and to determine a cost or fee for the item delivery service. The costs may be determined on behalf of, or calibrated for, the U.S. Postal Service, or for private delivery services such as for example UPS or FedEx. In various embodiments described herein, the postage or postal meter is further configured to accept, from a user, custom information or data, such as characters, numbers, text, etc. that is typed or otherwise entered into the postal meter by the user. The user-entered information may be referred to as supporting digital data and/or it may be information that refers to, points to, or otherwise describes supporting digital data, such as text specifying a link or a URL address for a digital/electronic resource, such as a webpage.

Exemplary Processing and Communications Systems

The present system and method employs one or more data processing and communication systems. Such systems include: desktop computers; file servers (as typically employed by companies for file maintenance, large-scale data processing, and customer support, and also distributed throughout the Internet backbone); both clients and servers of client-server systems; tablet computers; cell phones; and also specialized data processing systems such as delivery fee systems (e.g., postal meters) and delivery item sorting systems.

FIG. 1 illustrates some elements of an exemplary processing and/or communications system 100. Persons skilled in the relevant arts will appreciate that the elements shown are representative elements of such systems, and that particular data processing and/or communication systems may employ only some of the elements shown, or may employ variations on the elements shown, or may utilize additional elements not shown.

In an embodiment, a processing system 100 according to the present disclosure includes a processor or microprocessor 105; volatile memory 110 such as random access memory (RAM) for dynamic data processing and program storage; static or non-volatile memory 115 such a ROM/Flash memory for either or both of maintaining operating system and low-level hardware support code, and also for long-term data storage; and hard disk drives 120 or hard drive alternatives such as solid state drives (SSD) or flash drives for non-volatile, long-term but dynamic storage of very large quantities of data.

In some embodiments, a processing system 100 may also include a variety of user-interface elements, including audio elements 125 such as a speaker and/or microphone; a display screen 130, which may be a touch-screen display, for presentation of data and graphics to persons; and a keyboard 135 for entry of text, numbers, punctuation, and control actions. In some embodiments, touch-screen display 130 may provide dual functionality as keyboard 135. Processing system 160 may also additionally input controls such as a mouse or touchpad (not shown in the figure).

Processing system 100 may also include a variety of sensors 160, such as a location sensing via the global positioning system (GPS) or other location sensing elements, a camera or other optical sensors, or a scale to weigh items (as may be employed in a postage meter).

The processing system 100 may also include a wired communications system 140 (such as USB or Ethernet) or a wireless communication system 140 such as WiFi or BlueTooth. Communications system 140 enables the processing system 100 to communicate with other processing systems 100 via either or both of local communications networks and large-scale networks such as the Internet; and also to store and retrieve data from distributed cloud storage (not illustrated).

In an embodiment, processing system 100 may include either or both of an integrated scanner 155, which for example may be used to scan printed delivery items which are routed through a delivery item distribution system; and/or a printer 150, which may for example be used to print documents or labels, including for example printing of payment indicia or bar-coded postage labels by a postal meter. In an alternative embodiment, either of printer 150 or scanner 155 may be separate devices to which processing system 100 is connected via communications 140. Whether integrated into the structure of processing system 100 or connected via communications elements, in some embodiments processing system may be understood as including printer 150 or scanner 155.

In some embodiments, processor 105 is communicatively coupled to the memory 110 and other storage 115, 120, to the user interface elements 125, 130, 135, to communication system 140, to sensors 160, printer 150, and scanner 155 via one or more system buses 145. Bus 145 may include various bus-mastering control chips (not illustrated). Various embodiments of system bus architecture such as PCI, SCSI, AGP, EIDE, HyperTransport, and InfiniBand, well known in the art or others to be developed, may provide for efficient data transfer and/or communication between the compo- nents (105, 110, 115, 120, 125, 130, 135, 140, 150, 155, 160) of processing system 100 and may be employed in exem- plary embodiments in accordance with the present disclo- sure.

Typically, the processor 105 is configured to execute instructions and to carry out operations associated with the processing system 100. For example, using instructions retrieved from memory 110, 115, 120 (e.g., a memory block), processor 105 may control the reception and manipulation of input and output data between components of the processing system 100. Processor 105 typically oper- ates with an operating system to execute computer code and to import and generate data. The operating system, other computer code, and data may reside within the memory 110, ROM 115, and hard disk storage 120 that is operatively coupled to processor 105.

The operating system, other computer code, and data may reside in volatile memory 110 which is permanently built into the processing system 100 or installed in a slot on processing system 100; or on one or more removable, non-transitory storage medium (not illustrated) that is loaded or installed onto the processing system 100 when needed. Exemplary removable non-transitory storage media include CD ROM, PC-CARD, memory card, flash drives, floppy disks, and/or magnetic tape, and/or such other data and code storage media as may be developed in the future.

The operating system, other computer code, and data may also be hard-coded into processing system 100 either as dedicated logic within processor 105 or as non-volatile memory known as firmware 115.

In an embodiment, the instructions and data employed by the processing system may be organized into one or more modules. Such modules may be implemented, in whole or in part, as one or more of dedicated logic in processor 105; firmware 115; dedicated, specialized processors (repre- sented or subsumed in FIG. 1 by processor 105); and/or volatile memory 110. Software modules may be dynami- cally loaded and unloaded (for example, from disk drives 120) as needed to perform specialized tasks and operations.

As noted, processing system 100 typically includes a communications system 140, which may include either or both of a wired communications system and a wireless communications system. Communication system 140 may enable the processing system 100 to communicate with a wireless network, such as a cellular network (e.g., a GSM network, a CDMA network, or an LIE network), a local area network (LAN), and/or an ad hoc network.

Exemplary Systems for Digitally Informed Delivery

With reference to the discussion below, it is noted that the sender of a delivery item, that is, the person or organization who creates and initiates the delivery of an item to a recipient, is by convention often identified in human-read- able text form on the delivery item 202 by a sender name or organization name and sender address at a first conventional or designated position on the mailing envelope or transmittal label affixed to an envelope or package. It is also noted that the recipient of the delivery item, also known as the "addressee", is by convention typically identified in text form, on tangible delivery items 202, by a name or organi- zation name and recipient address which is again positioned at a second conventional or designated position on the package or mailing envelope, or on the transmittal label affixed to the envelope or package.

Figure 2:
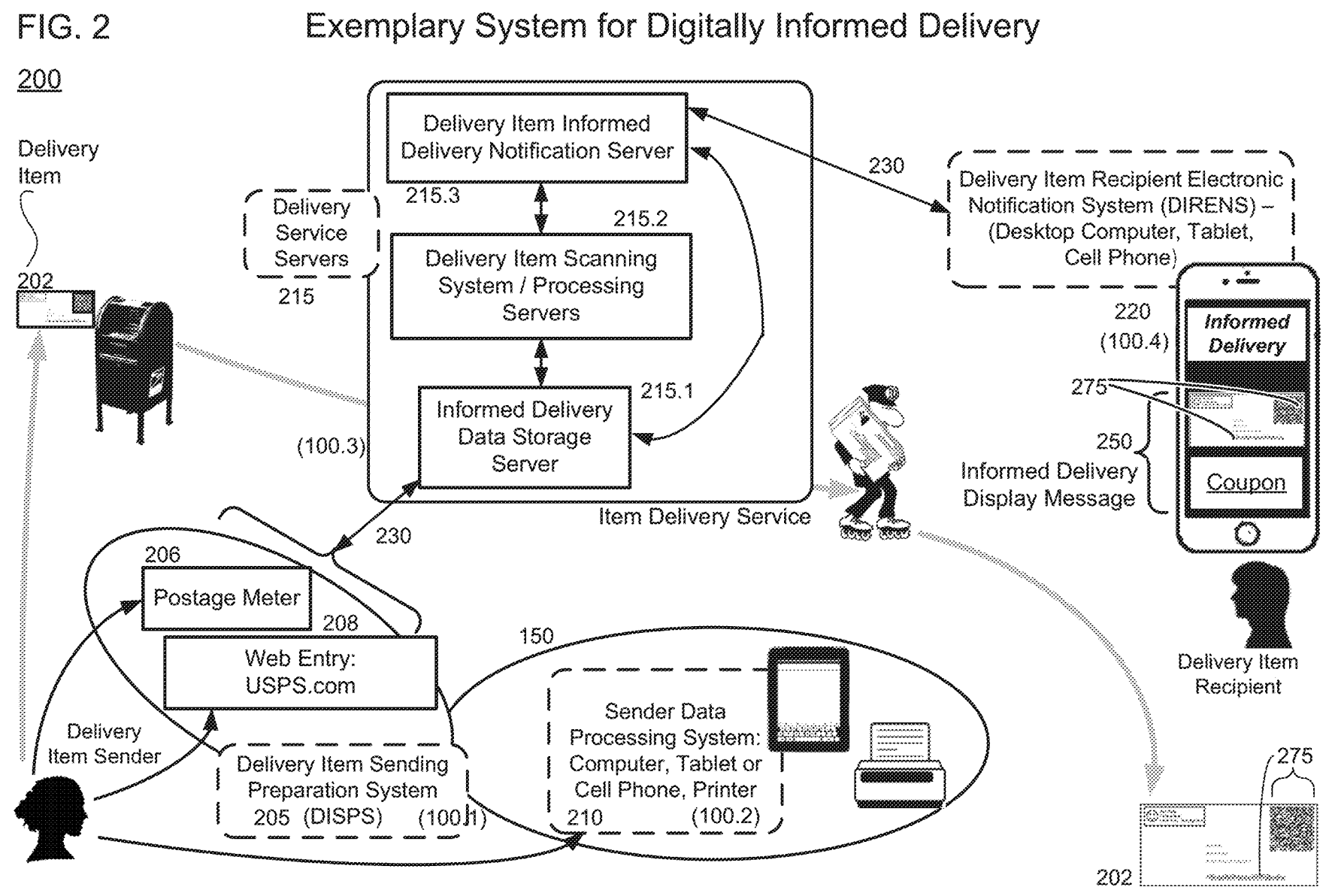

FIG. 2 illustrates some elements of an exemplary distrib- uted system 200 for digitally informed delivery of hardcopy, tangible delivery matter 202. Persons skilled in the relevant arts will appreciate that the elements shown are exemplary elements of such systems, and that particular informed delivery systems may employ only some of the elements shown, or may employ variations on the elements shown, or may utilize additional elements not shown.

In an embodiment, a digitally informed delivery system 200 according to the present disclosure includes a plurality of processing systems, which may include a delivery item sending preparation system 205 and/or a sender data pro- cessing system 210; one or more server systems 215 of a tangible delivery item carrier service such as the USPS, UPS, or FedEx; and a delivery item recipient notification system 220.

All such systems may be understood as varied implemen- tations or embodiments of exemplary digital processing and communications system 100 discussed above in conjunction with FIG. 1, and so are labeled parenthetically in FIG. 2 as: delivery item sending preparation system 100.1; sender data processing system 100.2; server system(s) 100.3; and deliv- ery item recipient notification system 100.4. However, these systems are referred to principally herein by the 200-series label numbers, 205, 210, 215 and 220, respectively.

Delivery Item Sending Preparation System (DISPS): In an exemplary embodiment, a system for digitally informed delivery of delivery items 202 includes a delivery item sending preparation system (DISPS) 205 intended for use by a person who is sending a tangible, physical delivery item 202. The person may for example be a service provider, a vendor of goods, a storekeeper, or even an individual person.

In an embodiment of the present system and method, the DISPS 205 may comprise or include a postage meter 206. Postage meter 206 may be configured to weigh a mail item 202, determine suitable postage, and have a printer 150 to print either a stamp or a barcode 275 to indicate the transmittal fee amount. Postage meter 206 may also be configured to collect payment for the transmittal of the delivery item, or bill for the fees via connection to suitable financial web servers (not illustrated).

In an embodiment, postage meter 206 may also be con- figured to accept entry of sender text or information via a keyboard 135 or voice entry or other means, enabling the sender to add a message, an e-mail address, a web URL, or other information or electronic resource (e.g., custom data 384) to be associated with the delivery item. In such embodiments, the postage meter 206 may be configured to print the custom data (e.g., text or other information that was entered by the sender) near or otherwise accompanying the postage indicia (e.g., barcode) 275. In an embodiment, postage meter 206 may include a scanner 155 to scan a document into electronic form (for example, a coupon or brochure), so the electronic document may be associated with the delivery item 202.

In an embodiment of the present system and method, postage meter 206 may be equipped with communications means 140 or removable storage means to upload data files which are to be associated with the delivery item 202.

In an embodiment, postage meter 206 uses communica- tions system 140 to connect with file servers 215 of the delivery service such as the USPS via a Wide Area Network (WAN) 230 such as the Internet, as discussed further below.

In an alternative embodiment or supplementary embodiment, the delivery item sending preparation system 205 may be a mail preparation web site or delivery item preparation web site 208, such as www.USPS.com, which is typically hosted or controlled by the delivery item carrier service (such as the USPS, UPS, or FedEx) and is typically configured for entry of transmittal information by the sending person. For example, the mail preparation web site 208 may be configured to receive mailing addresses; delivery item weight (as otherwise determined by the sender) or postal costs, transmittal costs or fees; and custom data 384 including text information, graphics files, data files, and URLs from the sender. The delivery item web site 208 may also be configured to return an image file containing suitable payment indicia 275 or delivery item barcodes 275 to be printed by the user, and then attached to the delivery item.

It will again be noted that the bar codes 275 and matrix codes 275 shown in FIG. 2, as well as in FIG. 3 discussed below, are exemplary only and are not meant to be limiting. Any suitable bar codes 275 or matrix codes 275, including those currently in use for item delivery applications (such as IMb and IBI); bar codes 275 and matrix codes 275 in general use but not currently employed for item delivery labeling; and bar codes 275 and matrix codes 275 to be developed in the future may be employed to encode the information described further herein, below.

Custom data and supporting digital data: Note that, in this document, custom data 384 may also be referred to equivalently as supporting digital data 384. In an embodiment of the present system and method, custom data 384 or supporting digital data (SDD) 384 is digital data which may be customized by the item sender. In a complementary or alternative embodiment, custom data 384 or supporting digital data (SDD) 384 is data which is intended or designated by the delivery item sender to support, complement, or supplement the sent item 202; and/or which is intended or designated by the delivery item sender to support the item recipient or use of the delivery item 202 by the recipient. In some embodiments, custom digital data 384 may be viewed as encompassing or including control rules 386, discussed elsewhere herein.

Sender Data Processing System: In an exemplary embodiment of the present system and method, the delivery item sender may have their own sender data processing system 210 which is configured to electronically support the sending of delivery item 202. In an embodiment, the sender data processing system 210 may be used to support or to implement DISPS 205, as well as to support any other number of other, general data processing requirements and business needs of the sender.

The sender data processing system 210 may include for example a conventional computer or tablet, or a cell phone, along with a printer 150 and/or image scanner 155. The sender data processing system 210 may be used for example to launch a web browser (such as Internet Explorer, Firefox, Chrome, Opera, and others well known in the art) to access and interact with the delivery item preparation web site 208 discussed immediately above. The sender data processing system 210 may employ printer 150 to print payment indicia and/or postage-related barcodes 275, and use a scanner 155 to scan documents for electronic association with the hardcopy delivery item 202.

Sender data processing system 210 may be configured with software, such as Microsoft Word or other word-processing or graphics programs, which may generate the delivery item barcodes 275 which are described herein as being based on sender-provided information. In an embodiment of the present system and methods, the word-processing software may create the delivery item barcodes 275 via a software add-on configured to implement the enhanced digitally informed delivery methods described herein.

Delivery Item Service Servers: In an exemplary embodiment, a system for digitally informed delivery of delivery items 202 includes exemplary computers such as exemplary servers 215, which are owned, operated, supported by, and configured by a delivery item carrier service such as the USPS, UPS, or FedEx; and/or the servers 215 are operated and maintained by a third-party on behalf of the item delivery service. The present system and method may also include all of, or elements of, the electronic and mechanical sorting and shipping systems (not illustrated in the figures) employed by the delivery service to transport and deliver the delivery item 202, as well as computers and servers 215.2 which support the sorting and shipping.

In an embodiment of the present system and method, exemplary delivery service servers 215 may include an informed delivery data storage server 215.1. In an exemplary embodiment, an informed delivery data storage server 215.1 may be configured to:

receive data from and send data to the sender's DISPS 205;

store sender address information;

store recipient address information;

store postage costs or transmittal costs and postage paid data;

store text, URLs, image files, and/or other data files uploaded by the sender (e.g., custom data 384), for ultimate electronic communication to the recipient, for enhanced digitally informed delivery.

The informed delivery data storage server 215.1 may also be configured to generate machine-readable indicia, such as a barcode 275 or 2D-matrix-code 275, which includes both transmittal information, and also the additional user-entered custom data, such as text, URLs, or links to data files, that is associated with enhanced digitally informed delivery. The details of this are discussed further below. The generated barcode 275 may be downloaded to the sender's DISPS 205, enabling the sender to print the barcode 275 or 2D-matrix-code 275 and attach it to the delivery item 202.

In an embodiment of the present system and method, exemplary delivery service servers 215 may include a delivery item scanning system/processing server 215.2. In an exemplary embodiment, a hardcopy delivery item scanning system/processing server 215.2 may be configured to:

receive data from one or more scanners or cameras which capture address data and/or barcode 275 or matrix-code 275 images from tangible, hardcopy delivery item 202 which is being processed (e.g., sorted and delivered) by the delivery service;

receive an image, from the cameras, of the exterior of the entire delivery item 202;

interpret or decode the address data, barcode data or 2D-matrix-code data of the delivery item 202;

identify in the barcode/2D-matrix-code data any text, URLs, or similar custom data, intended for the recipient, which the sender has previously included for enhanced digitally informed delivery;

identify an e-mail address and/or texting address, or similar electronic notification address, for the delivery item recipient, for example, either directly from data stored in the barcode/2D-matrix-code 275, or via data linkages from data stored in the barcode/2D-matrixcode 275 to other servers and data sources (such as
informed delivery data storage server 215.1);

transmit, to the Informed Delivery Notification Server
215.3 (described immediately below), any data to be
sent to the recipient via digitally informed delivery.

In an embodiment of the present system and method,
exemplary delivery service servers 215 may include an
informed delivery notification server 215.3. In an exemplary
embodiment, an informed delivery notification server 215.3
may be configured to perform an obtaining step [(I) below]
and a sending step [(II) below]:

(I) Obtain at least the following exemplary data, from
either or both of informed delivery data storage server 215.1
and/or hardcopy mail scanning system/processing server
215.2: (A) the e-mail address and/or texting address, or
similar electronic notification address, for the hardcopy
delivery item recipient; (B) a graphic image (e.g., in stan-
dard formats such a JPG, TIFF, PNG, or similar) of the
exterior of the delivery item 202; (C) identifying informa-
tion for the sender of the delivery item 202; (D) one or more
electronic text strings, URLs, images files, data files, or
other data structures, created or generated by the sender
(e.g., custom data 384), and associated by the sender with
the same delivery item 202 as for elements (A), (B), and (C)
immediately above; (E) one or more electronic text strings,
URLS, codes, identifiers, and other data generated internally
by the delivery service servers 215 for identifying, tracking,
and controlling the tangible delivery item 202 and associated
electronic data 382, 384, 386.

The "other data structures" (see element (D) immediately
above) to be gathered by the delivery service servers 215
(and then sent by servers 215, see next paragraph) may
include, for example and without limitation: identification
numbers for the tangible item delivery or elements of the
mailing; passwords (which may be encrypted); digital keys;
date/time information for key or critical dates (for example,
the expiration date of a coupon or offer); indexes indicating
which element in a series of elements has been sent; special
codes for control rules 386 (see. FIG. 3) or other purposes
which may indicate, for example, usages or limitations on
other associated electronic data structures (for example,
limits on the number of times a coupon may be used, or
limits to the number of users of a coupon); barcodes 275 or
links to barcodes 275 stored on third-party servers, which
may in turn provide additional information or resources; and
other data elements as well.

(II) Send to the delivery item recipient, at the one or more
electronic notification addresses identified in element (A)
above, two or more of the exemplary data identified above:
(B1) the graphic image of the delivery item; (C1) the
identifying information for the sender of the delivery item;
(D1) the one or more electronic text strings, URLs, image
files, data files, or other data structures, created or generated
by the sender, and associated by the sender with the delivery
item; and possibly (E1) some or all of the control rules 386
internal tracking codes for the delivery item 202 generated
in-house by the delivery service and its file servers.

In an embodiment of the present system and method, the
elements (B1), (C1), and (D1), as well as possibly other
electronic data elements associated with the delivery item
202, are sent as separate data elements to a delivery item
recipient electronic notification system 220 of the recipient,
such as a smart phone. In an alternative embodiment,
informed delivery notification server 215.3 arranges ele-
ments (B1), (C1), (D1), and possibly other electronic data
elements, into an image form suitable for presentation on the
delivery item recipient electronic notification system 220. It is noted that URLs, which may be included in the sent
information, may enable the recipient to access, via their
delivery item recipient electronic notification system 220, a
variety of additional web-based, electronic resources or
elements associated with the delivery item 202.

Alternative Embodiments for Delivery Service Servers: It
will be noted that the above exemplary description indicates
three different servers (215.1, 215.2, 215.3) for use by the
delivery service for the present system and method. Persons
skilled in the relevant arts will appreciate that the distinc-
tions among three servers is for convenience of exposition
only, to make varied functions more clearly apparent. In
alternative embodiments, the functions of two or more
servers may be combined on a single server, or the functions
described above may be distributed over more than three
servers. Further the functions described above for delivery
service servers 215 may be distributed over multiple servers
in ways other than the exemplary service distributions
indicated among the three servers 215.

Delivery Item Electronic Notification System:

In an exemplary embodiment of the present system and
method, the delivery item recipient may have their own
delivery item recipient electronic notification system
(DIRENS) 220 which is configured to receive e-mail, web
notifications, text messages, audio messages, or other elec-
tronic notifications, which may include images, and elec-
tronic files. In various embodiments, the DIRENS 220 may
be a cell phone, a tablet computer, a desktop computer, a
home or office television, or other data receiving and display
device.

In an embodiment, the DIRENS 220 may support any
other number of general data processing requirements and
business needs of the recipient, with digitally informed mail
delivery being just one of many applications. In such an
embodiment, digitally informed mail delivery may be sup-
ported by a module or application program within the
DIRENS 220. In an embodiment, digitally informed mail
delivery may be supported, within the DIRENS 220, by
applications or modules such as web browsers or e-mail
systems which also support many other forms of commu-
nication.

In an alternative embodiment, the DIRENS 220 may be a
dedicated electronic system configured to principally or only
support mail services for the recipient. For example, if the
delivery item recipient at various times also takes on the role
of delivery item sender, a specialized, dedicated postage
meter 206 may function in a dual role as an DISPS 205 and
as the DIRENS 220.

In an embodiment of the present system and method, the
DIRENS 220 is configured to receive, from the delivery
service (such as the USPS) via a Wide Area Network (WAN)
230 such as the Internet, data from the Informed Delivery
Notification Server 215.3. The received data pertains to the
delivery item 202 due for delivery (or which may have
already been delivered) and may include, for example and
without limitation:

the graphic image (e.g., in standard formats such a JPG,
TIFF, PNG, or similar) of the exterior of the delivery
item;

identifying information for the sender of the delivery
item;

the one or more electronic text strings, URLs, images
files, data files, or other data structures, created or
generated by the sender, and associated by the sender
with the same delivery item 202 (e.g., custom data
384);

and one or more electronic text strings, URLS, codes, identifiers, and other data generated internally by the delivery service servers 215 for identifying, tracking, and controlling the delivery item 202 and associated electronic data.

The other data structures which may be received by the DIRENS 220 may include, for example and without limitation:

identification numbers for the delivery item transmittal or elements of the delivery item transmittal;

control rules 386 for the delivery item transmittal or elements of the delivery item transmittal;

passwords (which may be encrypted) or digital keys;

date/time information for key or critical dates (for example, the expiration date of a coupon or offer);

indexes indicating which element in a series of elements has been sent; special codes which may indicate, for example, usages or limitations on other associated electronic data structures (for example, limits on the number of times a coupon may be used, or limits to the number of users of a coupon);

barcodes 275 or links to barcodes 275 stored on third-party servers, which may in turn provide additional information or resources; and other data elements as well.

In an embodiment of the present system and method, the DIRENS 220 is configured to present, via display 130 or other interface means, some or all of the received elements. Display of the received elements provides, to the recipient, notification of both the incoming delivery item 202, and associated electronic services. The displayed elements constitute an informed delivery display message, notification, or alert 250 (hereinafter "informed delivery display message 250").

For example, in an exemplary embodiment which is not limiting, the DIRENS 220 may present an image of the exterior of the delivery item; and, associated with that, such elements of custom data 384 as sender messages; links to web pages or web sites provided by the sender; images of coupons or special sales offerings; images of informational or instructional brochures and documents, along with links to download such documents; links to download and install application programs to accompany or support the delivery item 202; access to support web pages or support services; access to appointment calendars (for example, doctors' appointment calendars), electronic reading materials such as catalogs and magazines; and in general, a wide variety of other digital supporting data 384 including electronic data, information, files, and services which the sender intends as supporting or accompanying the delivery item 202.

In an embodiment, the DIRENS may also be configured, via the data received from the informed delivery notification server 215.3, to limit or control access to various sender-provided resources. For examples, the DIRENS may be configured to limit the use of an electronic coupon to one-time usage, or to limit access to a sender-provided application program to only those recipients who can provide a correct password.

In an embodiment of the present system and method, certain user actions, such as selecting a particular link or button in an informed delivery message 250, triggers the DIRENS to communicate back to the informed delivery notification server 215.3. For example, such a trigger action may cause the DIRENS to retrieve yet additional information or files from the informed delivery notification server 215.3, or to indicate to the informed delivery notification server 215.3 that a delivery item 202 has been received or has not been received.

Exemplary Informed Delivery System and Method

Referring now to FIG. 3, the present system and method embraces mail processing and mail data distribution methods which are operable on one or more digital processing and communications systems 100, such as the exemplary electronic device discussed above in relation to FIG. 1 and the various systems and servers 205, 210, 215, 220 discussed in conjunction with FIG. 2.

In an embodiment of the present system and method, the system and method may include elements of two or more of the delivery item sending preparation system 205, the sender data processing system 210, the one or more server systems 215 of the delivery service such as the USPS, and the delivery item recipient notification system 220. For example, the present system and method may include software running on several or all of the above systems. In alternative embodiments, the present system and method may entail elements, such as software, running on only one of the above systems, for example only the hardware and software of the delivery service server systems 215, or for example only the software running on the delivery item recipient notification system 220.

Such software contains instructions which, when stored in the memory 110, 115, 120 of the exemplary electronic devices 100, 205, 210, 215, 220, and executed by the processors 105 of those same devices, causes the electronic devices 100 to implement the operations, functions, and methods described here.

Referring now to FIG. 3, the present system and method for enhanced digitally informed delivery may embrace a method 300 to: (i) record in electronic form information and/or data pertaining to a delivery item 202, at least part of such information or data being inputted or customized by the sender of the delivery item 202, and (ii) to electronically deliver the information and/or data to the recipient of the delivery item 202.

FIG. 3 illustrates, both in flow chart form and via illustration of exemplary data elements and/or exemplary printed matter elements, an exemplary method for enhanced digitally informed delivery. The data elements illustrated are exemplary only, and many other similar forms of data may be entered or employed, consistent with the present system and method. In alternative embodiments, some data or data elements, or some tangible hardcopy elements, may be omitted.

The operations, functions, or steps which follow are exemplary only. Alternative or additional steps may be employed as well within the scope and spirit of the present system and method. The order of some steps may be re-arranged, or some steps may be omitted, within the scope and spirit of the present system and method.

Entry of conventional delivery item transmittal data: Method 300 begins with step 305. In step 305, the sender of a delivery item 202 provides various, possibly standard routing data and/or fee data or information 382 which is routinely associated with tangible item deliveries. The routine data 382 may include, for example and without limitation, the sender's name and address, the recipient's name and address, a postage meter number, and an amount of postage or other service fee for physical transmittal of the delivery item 202. Conventional delivery item data 382 may also be referred to simply as routine data 382 or transmittal data 382, and at a minimum generally includes sender identification data and recipient identification data.

In an embodiment of the present system and method, the routine data 382 may be entered via DISPS 205, for example via postage meter 206 or web entry 208 facilitated by a web browser on sender data processing system 210. In an embodiment, some or all of routine data 382 may be entered by automated systems 100 previously programmed or configured by the sender; for example, address information may be obtained from existing databases, and weight and postage cost information may be determined automatically or partly automatically by postage meter 206.

Entry of custom electronic data associated with the delivery item: Method 300 continues with step 310. In step 310, the sender of the tangible item 202 provides custom electronic recipient-targeted information or electronic recipient-targeted data 384 (hereinafter "custom recipient data 384" or "custom data 384"), intended for the recipient or intended to aid, support, or further communicate with the recipient, which is associated with the delivery item 202.

In an embodiment of the present system and method, the custom data 384 may be entered via DISPS 205, for example via postage meter 206 or web entry 208 facilitated by a web browser on sender data processing system 210. In an embodiment, some or all of the custom data 384 may be entered by automated systems 100 previously programmed or configured by the sender; for example, text or graphics 384 may have been previously generated and stored on sender data processing system 210, or on a postage meter 206 configured for such data storage. Similarly, custom electronic files (such as brochures or marketing materials) 384 may have been previously created or stored on sender data processing system 210, or on a postage meter 206 configured for such data storage.

In an embodiment, the sender enters unique, custom electronic supporting data 384 for each individual delivery item 202. In an alternative embodiment, a common element of custom data 384 (such as a web link, a product offering, a brochure, etc.) may be associated with two or more distinct delivery items 202 addressed for delivery to the same recipient or to different recipients.

Custom electronic data 384 may be entered, or the creation of such data 384 may be initiated or facilitated via automated processes, via suitably configured user interfaces on, for example, postage meter 206, postal web site 208, and/or sender data processing system 210. Unique, custom electronic data 384 which a sender may associate with a delivery item 202 may include, for example and without limitation:

- one or more electronic text strings which may be greetings, informational, promotional, service or product offerings, advice of requirements or needs for recipient actions, serve as greetings, serve as reminders to the recipient of the delivery item, indicate dates, times or deadlines related to the delivery item, or be any other kind of suitable text;
- Uniform Resource Locators (URLs), that is, a reference to a web resource (such as a web page or file) that specifies the location of the resource on a computer network, and a mechanism or protocol for retrieving it;
- images files, which may again be informational, promotional, serve as greetings, serve as reminders to the recipient of the delivery item, be decorative, be product or service coupons, be barcodes 275 or 2D-matrix-codes 275 or other graphical codes, or be any other kind of suitable graphics to be associated with the delivery item 202;

- data files, or other data structures, created or generated by the sender, and associated by the sender with the same delivery item 202;
- access to appointment or scheduling calendars (for example, doctors' appointment calendars);
- electronic reading materials such as catalogs, instructional materials, and magazines;
- passwords or password hints or cues.

Entry of custom electronic control rules: Method 300 continues with step 315. In some embodiments of the present system and method, step 315 may be omitted, either not being provided for in the system, or being provided for in the system but not employed in some cases by election or choice of the sender.

In step 315, the sender of the tangible item 202 may provide custom electronic control information, usage information, rules, or tracking information 386 (hereinafter "control rules 386"), pertaining to either the delivery item 202, to the electronic recipient-targeted data 384, or to both.

Here again, in an embodiment of the present system and method, the custom electronic control rules 386 may be entered via DISPS 205, for example via postage meter 206 or web entry 208 facilitated by a web browser on sender data processing system 210. In an embodiment, some or all of the control rules 386 may be entered by automated systems 100 previously programmed or configured by the sender; for example, control rules 386 or suitable algorithms to generate control rules 386 may have been previously generated and stored on sender data processing system 210, or on a postage meter 206 configured for such data storage.

In an embodiment, the sender enters unique, custom electronic control rules 386 for each individual delivery item 202. In an alternative embodiment, a common element of control rules 386 (such as a limit on the number of times a coupon may be used) may be associated with two or more distinct delivery items 202.

Custom electronic control rules 386 may be entered, or the creation of such control rules 386 by automated processes may be initiated, via suitably configured user interfaces on, for example, postage meter 206, postal web site 208, and/or sender data processing system 210. Unique, custom control rules 386 which a sender may associate with a delivery item 202 may include, for example and without limitation:

- indexes indicating which data element in a series of elements is to be included;
- special codes which may indicate, for example, usages or limitations on other associated electronic data structures including, for example and without limitation: limits on the number of times a coupon may be used, limits to the number of users of a coupon), date and/or time ranges for appointments to be entered via online calendars or schedules; and expiration dates for product offers, services, coupons, passwords, web site access, and similar;
- barcodes 275 or links to barcodes 275 stored on third-party servers, which may in turn provide additional information or resources; and other data elements as well.

In an alternative embodiment of the present system and method, the actions of entering or creating custom electronic data 384 and entering or creating custom electronic control rules 386 (that is, method steps 310 and 315) may be integrated into a single step. In an alternative embodiment of the present system and method, the actions of entering or creating custom electronic data 384 and entering or creating custom electronic control rules 386 (that is, method steps 310 and 315) may be accomplished via creation of one or more sender data files and/or configuration files, and/or combined send data and configuration files, which are then entered or uploaded locally by the sender via DISPS 205.

Data upload from sender to delivery service: Method 300 continues with step 320. In step 320, the sender of the tangible item 202 may upload the data 382, 384, 386 provided in steps 305, 310, 315 to the delivery service's uniformed delivery notification servers 215. The upload may be accomplished for example via WAN 230.

Delivery service storage and processing of uploaded sender data: Method 300 continues with step 325. In step 325, delivery service's informed delivery data storage server 215.1 stores and processes the data 382, 384, 386 received from the sender.

In addition to storing the data, the server 215.1 may process the data in a variety of ways. For example, internal memory links (for example, database links) may be created between, for example and without limitation: stored name and address information 382 for the sender and some or all of the custom data 384; stored name and address information 382 for the recipient and some or all of the custom data 384; stored name and address information 382 for the sender and some or all of control rules 386; stored name and address information 382 for the recipient and some or all of the control rules 386; and between custom data 384 and control rules 386 which apply to that data 384.

Other forms of linkages, file indexes, and various log entries may be envisioned as well. For example, the delivery service server 215.1 may create unique indexes or serial numbers for custom images 384 or other custom files 384 uploaded by the delivery item sender. Such indexes may be incorporated into a barcode 275 or 2D-matrix-code 275 to identify graphics or files 384 which will be available for electronic download by the recipient of the delivery item.

It is noted that a custom data file 384, a custom control rules file 386, or a combined data file 384, 386 may contain, compressed with a single file, multiple elements such as text, graphics, control codes, PDF files, and other files as well. The delivery service informed delivery data storage server 215.1 may index or apply a serial number to one entire, uploaded sender file 384/386; or may index or apply a serial number to one or more files and data elements contained within a single file 384/386; or both.

A service type identifier, which indicates the type(s) of electronic file(s) or service(s) that the delivery item sender has provided for the recipient, may be created as well.

Generation of barcode/2D-matrix-code representation: Method 300 continues with step 330. In step 330, delivery service's informed delivery data storage server 215.1 generates an indicia, such as a barcode 275 or 2D-matrix-code 275 which is based upon, and which incorporates, some or all of the sender data 382, 384, 386 created in steps 305, 310, 315.

A variety of 1D-barcodes/2D-matrix-codes 275 (hereinafter, simply "barcodes 275") are well-known in the art, and varied barcodes 275 may be employed by the present system and method. One delivery service, the United States Postal Service (USPS), currently employs or recognizes for mailing purposes at least three different bar codes, which have standardized recommended positions when attached to or imprinted on the exterior of delivery item envelopes:

IMb (Intelligent Mail Barcode), a four-state linear bar currently mainly used for mailing addresses, standards, and services, and usually placed at or near the recipient mailing address;

IBI (Information-Based Indicia technology), a 2D-matrix-code (for example, Datamatrix or PDF417) which currently serves as a barcode postage stamp, and is coded to include: the sender identification (originating address), postage meter number, amount of postage or transmittal cost, date of mailing or transmittal, and a digital signature to verify the stamp. Other information may be included as well.

It will again be noted that the bar codes 275 or matrix codes 275 illustrated in the figure are exemplary only and are not intended to be limiting. Alternative bar codes or matrix codes may be employed as well.

It is noted that additional bar codes 275 are sometimes employed to provide additional digital information on the mailing envelope, and are typically so positioned so as to ensure no confusion with the IMb or IBI.

In an embodiment of the present system and method, informed delivery data storage server 215.1, or some other delivery service server or information processing system, generates the IMb or IBI bar codes 275 according to known methods to include item transmittal data, which is already standardized, as described above.

In an embodiment of the present system and method, the data to be encoded may be encoded in a single bar code. In an alternative embodiment, the data may be distributed among two or more bar codes 275 or matrix codes 275.

Supporting Digital Data and Related Data (SDD-Related Data): In addition, in an embodiment of the present system and method, informed delivery data storage server 215.1 further encodes, into an existing barcode, such as the IMb or IBI bar code, the supporting digital data 384 and/or control rules 386, or additionally server-generated related data. These together may be referred to as Supporting Digital Data and Related Data (together, "SDD-Related Data"), and may include for example and without limitation:

some or all of the custom data 384 for the delivery item 202;

some or all of the control rules 386 for the custom mail data 384;

some or all of the unique indexes or serial numbers generated by the server 215.1 to identify custom images 384 or other custom files 384 uploaded by the delivery item sender;

a service type identifier, which indicates the type(s) of electronic file(s) or service(s) that the delivery item sender has provided for the recipient;

any other data or data structures which may be needed or helpful to associate the custom electronic data 384 or control rules 386 with any of the delivery item sender, the delivery item recipient, or the particular delivery item 202;

any active code or digital links which may be necessary or helpful to enable the delivery item recipient to access or utilize the electronic resources provided by the delivery item sender via the custom data 384 and custom rules 386.

In an exemplary embodiment, for instance, the barcode 275 may include, in suitably encoded form, an index and/or a web link to a sender coupon image stored on the informed delivery data storage server 215.1 or the sender data processing system 210.

In another exemplary embodiment the barcode 275 may include, in suitably encoded form, an index indicating a number of times a coupon may be used by the recipient. (Such usage may be tracked digitally in whole or in part by the delivery service, the sender, or by still other digital systems and servers 100, possibly provided by third-party vendors and not described herein.)

In another exemplary embodiment, the barcode 275 may include, in suitably encoded form, an index and/or a web link to a sender brochure or data file stored on the informed delivery data storage server 215.1 or the sender data processing system 210 or on a web server.

In another exemplary embodiment, the barcode 275 may include, in suitably encoded form, a simple text message, greeting, or informational message to be delivered electronically to the recipient of the delivery item 202.

In an embodiment, all such exemplary inclusions, to be encoded in barcode 275, were contained within or derived from custom data 384 and/or control rules 386 provided by the sender of the delivery item 202.

In an embodiment of the present system and method, steps 325 and 330, for processing received data 382, 384, and 386, for and generating the bar code 275, may be integrated into a single method step.

Transmission of barcode from delivery service to sender: Method 300 continues with step 335. In step 335, the delivery service informed delivery data storage server 215.1 transmits the bar code 275 electronically (for example, as an image file, such as a JPG, GIF, TIF, PNG or similar file) to sender data processing system 210 or more generally to DISPS 205.

Printing of barcode by sender: Method 300 continues with step 340. In step 340, the sender of the delivery item 202 prints barcode 275, either on a label or directly on a package or envelope, for example using sender data processing system 210 or more generally DISPS 205.

Physical movement of the tangible delivery item: If printed on a label, the label is then manually or mechanically attached to the exterior of the delivery item 202 (activity not shown in the flowchart of FIG. 3).

The tangible delivery item 202 is then placed in a suitable receptacle (such as a mailbox of the U.S. postal service, or a package receptacle of a private delivery services such as (FedEx, UPS, or the like), or handed to a suitable staff person, for handling and delivery by the delivery service, such as the USPS, FedEx, UPS, or the like (activity not shown in the flowchart of FIG. 3).

The delivery service then transports the delivery item 202 to one or more suitable delivery processing and sorting facilities, to enable ultimate transport to the recipient (activity not shown in the flowchart of FIG. 3).

Scanning of delivery item by delivery service: Method 300 continues with step 345. In step 345, the delivery item 202 is sorted for delivery. As part of the sorting, the delivery item 202 is scanned by scanners, cameras, or other devices suitably configured for optical scanning. The scanning obtains: (i) an image 202.1 of the delivery item 202 and (ii) an image 275.1 of the payment indicia 275. Both images 202.1 and 275.1 may be stored on the delivery service hardcopy mail scanning system/processing servers 215.2.

Decoding of barcode/2D-matrix-code by delivery service: Method 300 continues with step 350. In step 350—which may be performed for example by delivery service hardcopy mail scanning system/processing servers 215.2—the delivery service decodes barcode/2D-matrix code image 275.1. The delivery service thereby obtains or retrieves suitable transmittal information 382 such as sender address, delivery address, postage amount or transmittal fees, and similar information. The decoding process also obtains/retrieves the sender-defined custom data 384 and, where applicable, sender-defined controls 386 which are associated with the delivery item 202.

Construction of informed delivery mail message by delivery service: Method 300 continues with step 355, which may be performed for example by delivery service hardcopy mail scanning system/processing servers 215.2 and/or by delivery service informed delivery server 215.3.

In step 355 the delivery service creates a suitable notification 250 or message 250 for the recipient of the delivery item 202. The notification 250 may be for example an e-mail to be sent to the delivery item recipient; or may be a message suitable for inclusion on an active server page which may be accessed by the delivery item recipient; or may be a cell phone text message; or may be some other form of electronic messaging.

In an embodiment, the informed delivery notification message 250 may include, for example and without limitation:

the image 202.1 of the mailing envelope or package of the delivery item 202;

a description of the delivery item 202;

the sending address of the sender of the delivery item 202;

other contact information for the sender of the delivery item 202;

some or all of the sender's custom data 384 which was encoded into, or referenced by, bar code 275, including sender messages, sender-defined URL's, sender-created or selected images, images or partial images of sender brochures or other sender documents, passwords, access codes, and other sender-defined documents and data; and indications or descriptions of some or all sender control rules 386, such as expiration dates, limits on data usage (such as limits on the number of times a coupon may be used), and other control information.

In an alternative embodiment, delivery service server(s) 215.2, 215.3 do not construct the entire message 250, but instead create a data package with essential elements of the message (such as essential text, links, images, etc.). In such an embodiment, some aspects of constructing the final notification message may be offloaded to informed mail delivery software, modules, or services running on DIRENS 220.

In an alternative embodiment, the message 250 may be created as an audio message for visually-impaired delivery item recipients.

Transmission of informed delivery message by delivery service: Method 300 continues with step 360, which may be performed for example by delivery service hardcopy mail scanning system/processing servers 215.2 and/or by delivery service informed delivery server 215.3. In step 360 the delivery service servers 215.2, 215.3, communicate the informed delivery message 250 to the delivery item recipient. Communication may be for example via e-mail, display on a suitable web page, or texting. Other means of transmission, including for example audio transmissions (for vision-impaired recipients) may be employed as well.

Receipt/viewing of informed delivery message by delivery service: Method 300 continues with step 365, which may be performed for example via Delivery Item Electronic Notification System (DIRENS) 220. In step 365, the informed delivery message 250 is received by the recipient's DIRENS 250, and may be viewed by the delivery item recipient. In an embodiment, the message 250 may include both a notification of an expected delivery date of the delivery item 202 and an image 202.1 of the delivery item 202. The message 250 may also include some or all of the elements of custom data 384, such as custom text messages, graphics, and links to files or web pages designated by the sender of delivery item 202. The delivery item recipient may view message 250 at their convenience.

Active response by recipient to informed delivery message: Method 300 continues with step 370, which may be performed for example via DIRENS 220. In some embodiments of the present system and method, step 370 may be omitted, either not being provided for in the system and method; or being provided for in the system but not employed in some cases by election or choice of the sender; or being provided for by the sender, but not employed in some cases by election or choice of the delivery item recipient.

In step 365, the recipient of delivery item 202 and informed delivery message 250 selects an active element or link in message 250. The selection may be made by user-interface methods well known in the art, for example by the user tapping on a link or hotspot in message 250 on a touch-screen display of DIRENS 220. Selective or activating such a link causes DIRENS 220 to initiate suitable action, such as sending an action request via WLAN connection 230 to USPS informed delivery notification server 215.3. The request may entail, for example and without limitation, a request to access a web site indicated via a URL in message 250; or to view or download a file which is referenced by message 250; or to engage in a commercial or sales transaction which may incorporate or be modified by an electronic coupon included in message 250. Other electronic requests may be made as well.

Further electronic action by delivery service: Method 300 may continue with step 375, upon receipt of an electronic request from the delivery item recipient, as per step 370. In step 375, additional electronic services are provided to the delivery item recipient in response to the request from the recipient, the request having been sent in step 370 of the method (immediately above). Additional services may entail, for example, and without limitation, providing access to a requested web page; transmitting a requested file, or engaging in a sales or other commercial transaction which may be modified by an electronic coupon embedded in message 250. Other services may be provided as well.

In an embodiment of the present system and method, the requested services may not be delivered, or may be delivered in modified or constrained form, based upon control rules 386. For example, control rules 386 may constrain a number of times an electronic coupon may be used, or may limit access to a web page or to a document based on password access or similar access.

In an exemplary embodiment, control rules 386 may limit electronic access to a web page, an electronic document or other service based on a password or other control codes or actions; while the password or control codes or actions may not be included at all in informed delivery display message 250, and the password/control code or control actions may for example be provided to the recipient only via delivery item 202. In this way, the present system and method may provide an increased level of security for access by the delivery item recipient to certain electronic resources, requiring receipt of both the delivery item 202 and display message 250.

The services provided in step 375 may be provided by, for example and without limitation, delivery service servers 215, sender data processing system 210, or other third-party servers as designated by the delivery service or the delivery item sender.

In some embodiments of the present system and method, step 375 may be omitted, either not being provided for in the system and method; or being provided for in the system but not employed in some cases by election or choice of the sender; or being provided for by the sender, but not employed in some cases by election or choice of the delivery item recipient (that is, the delivery item recipient chooses to not active a link or hotspot in received message 250).

Alternative Embodiments

In an alternative embodiment, some elements or method steps described above, on conjunction with FIGS. 2 and 3, may be provided via digital processing and communications systems 100, 205, 210, 215, 220 other than the ones indicated. In some embodiments, such choices of processor substitutions may result in limitations on some features or method steps. In some embodiments, such choices of processor substitutions may enable enhancements of some features or method steps.

For example, as described above, custom sender data 384 and custom sender control rules 386 are uploaded from DISPS 205 (possibly via Sender Data Processing System 210) to delivery service servers 215. Delivery service servers 215 generate a suitable bar code 275 as well as storing the data 384 and rules 386.

In an alternative embodiment, at least some custom sender data 384 and/or custom sender rules 386 are not uploaded to delivery service servers 215. Instead, the custom data 384 and/or customer rules 386 may be employed locally, by the sender, to generate bar code 275 on the senders DISPS 205 and/or sender data processing system 210. The sender's locally generated barcode 275 may then be affixed to the exterior of the delivery item 202 (for example, to a mailing envelope). In such an embodiment, when the delivery item 202 is scanned at the delivery item sorting facility, delivery service servers 215 may extract all needed custom data and/or rules from the locally generated barcode 275. Delivery service servers 215 may then forward the custom data 384 and/or rules 386 to the recipient in the informed delivery display message 250.

For an example, which is not intended to be limiting, the sender may elect to include a simple text message, or a simple URL to be associated with the delivery item 202, but no graphics or other large files. The simple text message or URL may be encoded locally by the sender via DISPS 205, and the barcode 275 generated locally by the DISPS. In such an embodiment, the delivery service servers may not need to store the custom data, nor need to store any large electronic files associated with the delivery item. The message or URL is simply encoded into the barcode 275; extracted from the barcode by mail scanning system 215.2; and sent to the recipient electronically by informed delivery notification server 215.3.

Such an alternative embodiment may be implemented, for example and without limitation, in a software module of a word processing program, for example Microsoft Word, which may be employed by the delivery item sender. In particular, such an embodiment may work with the INB barcode 275 provided by MS Word, which employs the same general principles but possibly encodes less data than the delivery service-generated barcodes 275.

Alternatives to bar codes for payment indicia: Persons skilled in the relevant arts will understand that payment indicia 275 may be implemented by image means or data encoding means other than barcodes 275; such alternatives may be generated and used by the present system and method for attachment to delivery item 202, and for thereby attaching to the delivery item 202 any or all of conventional delivery item information 282 (including postage or transmittal fees), custom data 384, and control rules 386.

For example, in an alternative embodiment, the present system and method may employ holographic image media in place of bar codes 275; the holographic image may be generated by delivery service servers 215, transmitted from servers 215 to DISPS 205, and physically generated via a holographic printer device of the sender (in place of a conventional printer 150). The hologram may be physically attached to delivery item 202, and later scanned by suitable holographic scanners of the delivery service.

In another alternative embodiment, the present system and method may employ light-weight radio frequency chips (such as RFID chips known in the art or to be developed), functioning in substantially the same role as barcodes 215 as described elsewhere in this document. It will be noted that an RFID chip may be affixed in, or included interior to, a delivery item envelope 202, as well as exterior to delivery item 202. Such chips may be imprinted with data and read, by any or all of the delivery item sender, delivery service, and delivery item recipient, using RFID writers and readers known in the art or to be developed.

Higher data densities on tangible delivery items, and generalized payment indicia or generalized digital stamps for attachment to delivery items: It will be understood that in such alternative embodiments, employing for example and without limitation holographic stamps or RFID chips/stamps, higher data densities may be achieved than with conventional barcodes 215. Higher data densities for physical attachment to delivery item 202 may also be achieved with enhanced barcodes employing, for example, smaller/micro pixel elements and/or multicolored pixel elements or similar. In an embodiment, higher data densities may be achieved simply by employing larger barcodes 215 which cover larger areas of the exterior portions of delivery item 202.

Persons skilled in the relevant arts will appreciate that if higher data densities are employed as part of a generalized digital stamp 275, generalized digital indicia 275, or enhanced digital stamp 275 (hologram, RFID chip, and other possible embodiments), then additional, sender-customized data may be transmitted affixed to the delivery item 202 as part of the generalized digital indicia 275. For example, large images, video files, or even executable programs may be encoded in a generalized digital indicia 275 to be affixed to the delivery item 202. In such embodiments, many elements of the present system and method may still be employed or even enhanced, including the selection of by the delivery item sender—and sending of from the delivery item sender—customized digital item transmittal data to be associated with the delivery item 202.

Figure 4:
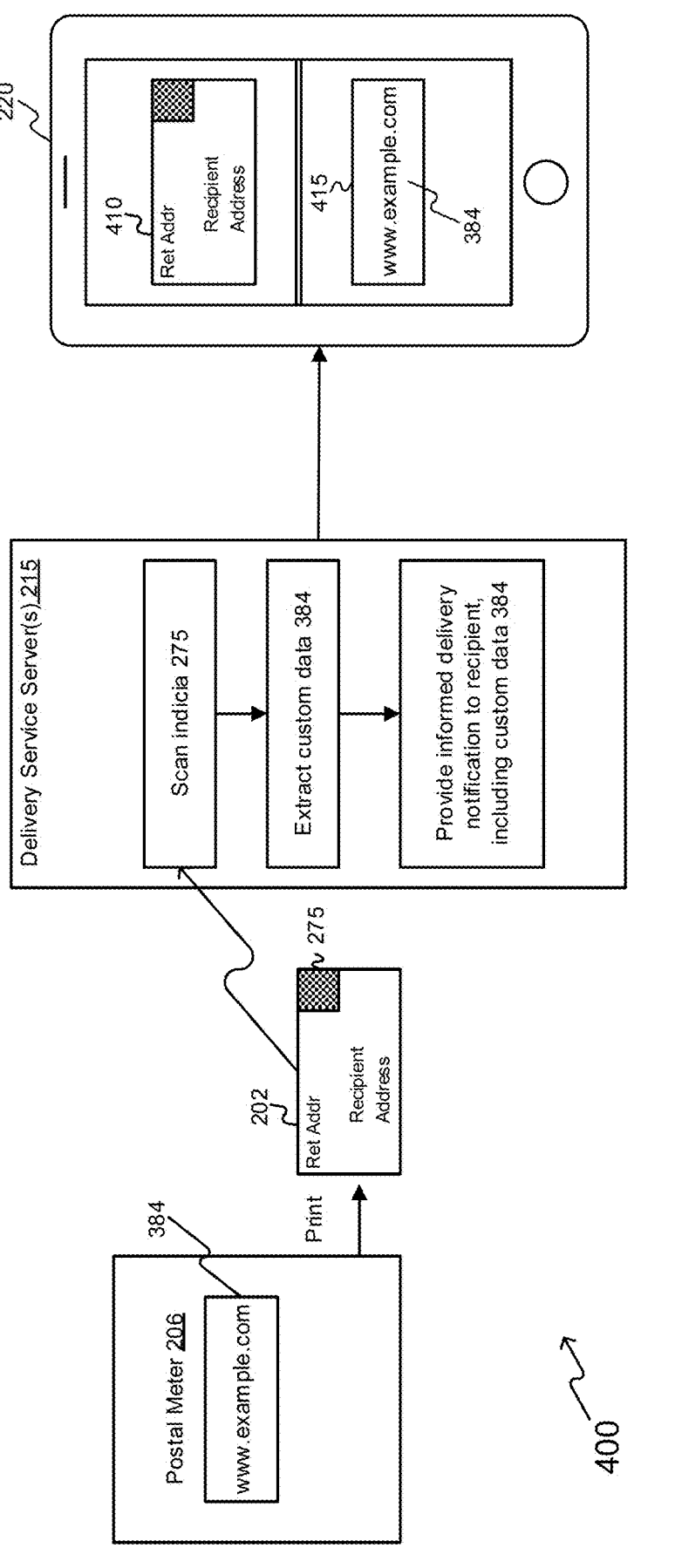
FIG. 4 depicts another example of a system for digitally informed delivery of physical, tangible delivery items.

FIG. 4 depicts another example of a system 400 for digitally informed delivery of physical, tangible delivery items. In this example, the sender uses a postal meter to input their custom data for the informed delivery service, and the postal meter does not communicate with the delivery service servers or systems.

As shown in FIG. 4, the system 400 includes a postage meter 206; one or more delivery service server(s) 215, which may include a Delivery Item Scanning/Processing System 215.2 (e.g., letter sorting machines and the like) and an Informed Delivery Notification Server 215.3; and a delivery item recipient notification system 220 (e.g., a smart phone running a browser that enables a recipient to access to an informed delivery website provided by the delivery service (e.g., usps.com), or running an application that receives and presents notifications, messages, and/or data related to informed delivery, such as an email application, a texting application, or a specialized Informed Delivery Notification application).

As described previously, the sender of a delivery item 202, such as a letter, may use the postal meter 206 to create a payment indicia 275 for the delivery item 202 and to enter and add custom data 384, 386 to the payment indicia 275. As shown, the sender (e.g., a business owner who is sending out advertisements or coupons or the like) may type the URL "www.example.com" into the postal meter 206 as the custom data 384 for use in electronically notifying the recipient that the delivery item 202 is in route or delivered. As described previously, the sender also enters the standard delivery item transmittal data 382 into the postal meter 206, as is needed for proper generation of the payment indicia 275.

When all the needed data is entered, the postal meter 206 prints out the payment indicia 275, for example, on a label that is then attached to the delivery item 202 or directly onto the delivery item envelope 202. As described previously, the payment indicia 275 (e.g., barcode or other a machine-readable representation) includes both conventional delivery information (such as recipient name and address, postage amount paid, etc.) and novel custom data 384, which in this example is a machine-readable representation of the URL "www.example.com."

The sender then gives the delivery item 202 with its payment indicia 275 to the delivery service for delivery to the recipient. For example, the sender may drop the delivery item 202 into a collection box for the U.S. Postal Service, FedEx, or the like.

Eventually, as described previously, the delivery item 202 and its payment indicia 275 will be photographed or scanned 440 by the delivery service server(s) 215 and its associated automated equipment, such as a sorting machine or the like that is connected to a Delivery Item Scanning/Processing Server 215.2 or the like. As described previously and as shown at 442, the delivery service server 215 reads, decodes or otherwise extracts the custom data 384 (e.g., "www.example.com") from the indicia 275, for use with the informed delivery service.

At 444 and as described previously, the delivery service server 215 transmits, sends, notifies regarding, or otherwise provides an informed delivery notification to the delivery item recipient notification system 220 (e.g., smart phone). In various implementations, the informed delivery notification webpage, message, or data includes an image 410 of the delivery item 202 and the custom data 384 (if any) entered by the sender via the postal meter 206.

As shown in the example of FIG. 4, the delivery item recipient notification system 220 receives (e.g., wirelessly) the informed delivery notification message/data and displays, accesses, or otherwise presents the image 410 of the delivery item 202 along with the custom data 384. In various implementations, the custom data 384 can provide the recipient with information, services, offers, etc., that are related to the tangible delivery item 202, the sender, the sender's business, or the like, which may be of interest to the recipient. In some implementations, the custom data 384, ("www.example.com" in the instance shown in FIG. 4) may be presented as a link 415 that the recipient can activate (e.g., click on) to access a resource, information, or the like. In this example, clicking on the link for "www.example.com" provides the recipient with access to the webpage at that URL.

Figure 5:
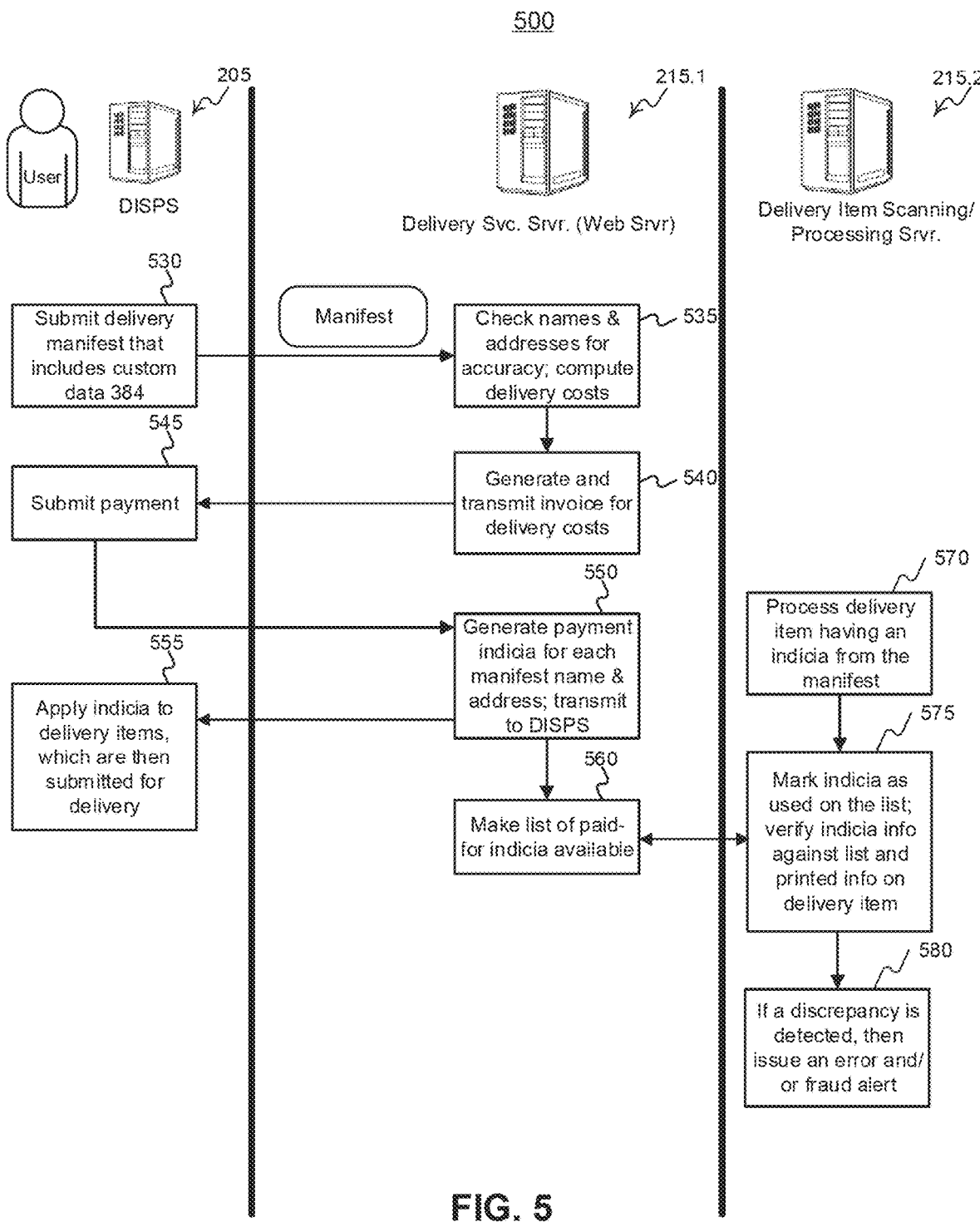
FIG. 5 is a swim-lane diagram showing an example of a method and system for processing a mailing-list manifest and the delivery items, using informed delivery notification.

FIG. 5 is a swim-lane diagram 500 showing an example of a method and system for processing a mailing-list manifest and its delivery items, using informed delivery notification. This example illustrates how the system enables the sender of a large number of items 202, such a small business that is doing a mass mailing of advertising material, to efficiently generate a large number of payment indicia 275 that each includes custom data used for informed delivery notification to the recipient, and how the system detects errors and fraudulent use of the generated payment indicia 275.

As shown in FIG. 5, the system 500 includes a delivery item sending preparation system (DISPS) 205, (e.g., a computer 210, tablet, smart phone or the like employed by a sender); informed delivery data storage server 215.1, (e.g., a web server that hosts a website for the delivery service, such as usps.com); and a delivery item scanning/processing system 215.2, (e.g., a letter sorting machine, package sorting machine, or the like).

The process shown in the example of FIG. 5 begins at 530 when the DISPS 205, under control of the sender, transmits, uploads, or otherwise submits a delivery manifest to the informed delivery data storage server 215.1 (e.g., a web server for usps.com). In various implementations, this may be the same as, similar to, or employ one or more features of step 320, which is described above.

In various implementations, the manifest may include a set or row of data for each recipient that will receive a delivery item 202 from the sender. Table 1 represents an example of the data in a manifest.

TABLE 1

| Name | Address | 1$^{st}$ Custom Data | 2$^{nd}$ Custom Data |
|------|---------|---------------------|---------------------|
| A. Able | 111 Elm St. Fairfax, VA 22030 | www.example.com | COA, ID-WD, C-RULE1 |
| B. Baker | 222 Pear St. Herndon, VA 20171 | www.sender.example | COA, ID-ASAP, C-RULE1 |
| C. Charlie | 333 Ash St. Fairfax, VA 22030 | www.example.com | COA, ID-WD |
| D. Delta | 444 Lilac St. Fairfax, VA 22030 | www.example.net | COA, ID-ASAP, C-RULE2 |
| . . . | . . . | . . . | . . . |

As represented in the example of Table 1, the manifest includes the name and address of each recipient and zero or more custom data elements for each recipient—in this example, a URL and one or more rules for each recipient. In various implementations, the custom data elements of the manifest may be any of the custom data 384 and/or control rules 386 described previously and below. As described herein, the system uses the custom data 384 and/or control rules 386 to provide custom electronic supplements with the informed delivery notification to each recipient. For example, the URL specified in the first custom data field (third column of Table 1) may be the electronic supplement that is provided to the recipient in conjunction with the informed delivery notification, e.g., as a link that the recipient can activate to visit a website and get additional information, as described previously.

More particularly with regard to the rules in the second custom data field (right column) of Table 1, the rules may specify certain types of services or processing to be performed by the system in conjunction with the informed delivery notification for each particular recipient, i.e., for the recipient specified in the same row of Table 1. For example, the rules may instruct the delivery service to: provide change of address information to the sender, if available; destroy the delivery item 202 if it is undeliverable; provide the custom data 384 (e.g., the URL in the third column) to the recipient as soon as possible; delay providing the custom data 384 (e.g., the URL in the third column) to the recipient until the delivery item 202 has been delivered or at some specified time or event; display the custom data 384 (e.g., the URL in the third column) in a specific way to the recipient—e.g., in a green Arial font, etc. As noted, in various implementations, the rules in the second custom data field may also be or include the control rules 386 described previously.

The example of Table 1 is abbreviated for clarity of explanation, and in various implementations, the manifest may include additional information, such as the information referred to as delivery item transmittal data 382 described previously. This may include sender information and information describing the delivery item 202; e.g., information indicating that the delivery items 202 is a first class letter, a first class flat, etc.

Referring again to the example shown in FIG. 5, upon receiving the manifest at 535, the informed delivery data storage server 215.1 checks the names and addresses on the manifest for accuracy, which may include correcting the inaccurate ones. The server 215.1 also computes the delivery cost (e.g., the postage) for delivering the items 202 to the recipients listed on the manifest. In various implementations, this may be the same as, similar to, or employ one or more features of step 325, which is described above.

At 540, the server 215.1 generates an invoice for the delivery cost and transmits, displays, or otherwise provides the invoice to or via the DISPS 205. Or in other words, the invoice is provided to the sender who submitted the manifest.

At 545, the sender, using the DISPS 205, submits payment of the invoice amount, and in response at 550, the server 215.1 generates a group of payment indicia 275, one for each recipient on the manifest, (e.g., for each name and address in the left columns of Table 1), and transmits, displays, or otherwise provides the group of payment indicia 275 to the DISPS 205. In various implementations, this may be the same as, similar to, or employ one or more features of steps 330 and 335, which are described above. In some implementations, the server 215.1 may host a website (e.g., usps.com) that includes shopping cart functionality or the like, and the sender may pay online through the website using a credit card, or the like.

As described herein, each of the payment indicia 275 may include the custom data 384, 386, which may, for example, be embedded or encoded in a barcode that embodies the payment indicia 275. In some implementations, the server 215.1 may also provide a list of corrected names and addresses, which was generated at stage 535, to the DISPS 205, for use on the delivery items 202, in place of the inaccurate names and addresses that were on the submitted manifest.

At 555, the DISPS 205 applies or supplies each of the payment indicia 275 to a physical delivery item 202, and the group of physical delivery items 202 is submitted to the delivery service for delivery. In various implementations, this may be the same as, similar to, or employ one or more features of step 340, which is described above. In some implementations, the DISPS 205 may print the payment indicia 275 onto a label or sticker that is applied to the delivery item 202, or may print the payment indicia 275 directly onto an envelope, cover, packaging or the like of the delivery item 202. In some implementations, the DISP 205 may also apply or supply the corrected names and addresses (if any) received from the server 215.1 to the appropriate delivery items 202, so that the items 202 are processed correctly during sorting and delivery by the delivery service.

At 560, the server 215.1 makes a list of the paid-for indicia 275, (i.e., the group of indicia 275 generated from the manifest received at 535), available to other devices of the delivery service. In various implementations, the list includes information describing and/or contained in each indicia 275 that was generated at 550, and information from the manifest, as described above. Thus, in various implementations, the list includes, for each indicia 275, one or more of: the indicia's unique identifier (e.g., serial number or the like), the sender's name and address, the recipient's name and address, the delivery fee (e.g., postage cost), the custom data 384, 386, and/or information describing the delivery item 202 (e.g., first class letter), and the like.

At some time after the sender submits the group of physical delivery items 202 to the delivery service for delivery, the delivery item scanning system/processing server 215.2 (e.g., which includes or is connected to a letter sorting machine, a flat sorting machine, or the like) processes one of the delivery items that has one of the indicia 275, as shown at 570 of FIG. 5. In various implementations, this processing includes scanning the indicia 275 and decoding its data. In various embodiments, this processing also includes performing the informed delivery notifications actions described herein, including electronically providing the custom data 384 to the recipient and/or providing or implementing the rules 386. In various implementations, this processing may be the same as, similar to, or employ one or more features of steps 345-360, which are described above.

At 575, the delivery item scanning system/processing server 215.2 accesses the list of indicia and marks as "used" the indicia 275 that it has processed at 570. In various implementations, after an indicia 275 is marked as used, the delivery service will no longer issue a refund for that indicia, if requested by the sender, or allow another use of the same indicia 275. In addition, the server 215.2 verifies the information encoded in the indicia 275 against the information in the list of paid-for indicia and against the printed information (e.g., the recipient's printed name and address) on the delivery item 275 that it has processed at 570. In various embodiments, this verification may use the indicia's unique identifier (e.g., serial number or the like) which may be both encoded in a barcode and included for each entry in the list.

At 580, if the discrepancy is detected by the comparison and verification of the information in 575, then the delivery item scanning system/processing server 215.2 issues a fraud and/or error alert or message. The alert may alter the normal operation of the informed delivery notification system. For example, if the original manifest (and the indicia 275 generated therefrom) has a recipient name and address in Toledo, Ohio, but the physical letter 202 processed by server 215.2 has a printed recipient address in Miami, Florida, then there is some error or fraud, and the system may not implement an informed delivery notification to the recipient(s) (e.g., may not perform steps 355-375 as described above) and/or may not provide the custom data 384 with the informed delivery notification. In addition, because the cost of sending a delivery item 202 to Toledo may be much cheaper than to Miami, depending on the location of the sender, the non-matching printed address on the delivery item 202 may indicate a fraudulent underpayment of postage, which the delivery service may investigate and/or perhaps return the item 202 to the sender.

CONCLUDING REMARKS

In the specification and/or figures, typical or exemplary embodiments of the system and method have been disclosed. The present invention is not limited to such exemplary embodiments. The use of the term "and/or" includes any and all combinations of one or more of the associated listed items. The figures are schematic representations and so are not necessarily drawn to scale, and the method steps disclosed in figures may only be summaries of method steps described in more specific and greater detail in the text of the disclosure. Unless otherwise noted, specific terms have been used in a generic and descriptive sense and not for purposes of limitation.

What is claimed is:

1. A system for providing digital data associated with a tangible delivery item that is sent from a sender to a recipient, the system comprising:

one or more processor; and a memory operatively coupled to the one or more processor, wherein the memory is configured to store data comprising:

conventional delivery item data comprising sender identification data for the tangible delivery item and recipient identification data for the tangible delivery item; and supporting digital data (SDD) that is distinct from the conventional delivery item data and that is lacking information identifying the recipient, wherein the SDD comprises additional information that is associated with the tangible delivery item;

wherein the one or more processor is configured to perform operations comprising:

generating an image of an indicia that is configured for application to an exterior of the tangible delivery item, the indicia including data comprising:

at least a portion of the conventional delivery item data; and at least a portion of the additional information;

receiving an image of the exterior of the tangible delivery item during sorting, the image including the indicia;

decoding the indicia to obtain the at least a portion of the conventional delivery item data and the at least a portion of the additional information; and sending, to a processing device of the recipient, a digital message comprising the at least a portion of the additional information.

2. The system of claim 1, wherein the additional information comprises text data.

3. The system of claim 1, wherein the additional information comprises at least one of:

a link enabling digital access from an electronic device;

a universal resource locator (URL);

an image;

a data file;

an index indicative of at least a portion of the SDD uploaded by the sender;

an identifier indicating a type of data in the SDD; or an identifier indicating a type of service associated with the SDD.

4. The system of claim 1, wherein the one or more processor is further configured to perform operations comprising:

receiving the conventional delivery item data and the SDD via an electronic transmission from an electronic device of the sender.

5. The system of claim 1, wherein the one or more processor is further configured to perform operations comprising:

receiving a control rule from the sender.

6. The system of claim 1, wherein the one or more processor is further configured to perform operations comprising:

receiving a digital request from an electronic device of the recipient, the digital request comprising a request for access to data associated with the SDD; and providing, to the electronic device of the recipient, the requested access.

7. The system of claim 6, wherein the one or more processor is further configured to perform operations comprising:

providing the requested access according to a control rule received from the sender.

8. A computer-implemented method for providing digital data associated with a tangible delivery item that is sent from a sender to a recipient, the method comprising:

receiving from a processing device of the sender:

conventional delivery item data comprising sender identification data for the tangible delivery item, and recipient identification data for the tangible delivery item; and supporting digital data (SDD) that is distinct from the conventional delivery item data and that is lacking information identifying the recipient;

generating an image of an indicia that is configured for application to an exterior of the tangible delivery item, the indicia including data comprising:

at least a portion of the conventional delivery item data; and

SDD-related data corresponding to the SDD;

receiving an image of the exterior of the tangible delivery item during sorting, wherein the image includes the indicia;

decoding the scanned image to obtain the at least a portion conventional delivery item data and the SDD-related data; and sending, to a processing device of the recipient, a digital message comprising the SDD-related data.

9. The method of claim 8, wherein the SDD-related data corresponding to the SDD comprises at least one of:

a full contents of the SDD;

text data from the SDD;

an image from the SDD;

a link enabling access from an electronic device of the recipient to a storage location of the SDD-related data;

an index indicative of at least a portion of the SDD-related data;

an identifier indicating a type of data in the SDD-related data; or an identifier indicating a type of service associated with the SDD-related data.

10. The method of claim 8, further comprising:

storing a data element of the SDD, the data element comprising at least one of:

all the data of the SDD;

text for reading by the recipient;

an audio message for hearing by the recipient;

a graphic for electronic viewing by the recipient;

an executable program for execution by an electronic device of the recipient;

an electronic document for access by the recipient; or a link to a remote digital resource for access by the recipient.

11. The method of claim 8, further comprising:

receiving, from the processing device of the sender, a control rule comprising a use count indicating a number of permitted uses of the SDD-related data by the recipient.

12. The method of claim 8, further comprising:

receiving a digital request from an electronic device of the recipient, the digital request comprising a request for access to the SDD-related data; and providing, to the electronic device of the recipient, the requested access to the SDD-related data.

13. The method of claim 12, further comprising:

limiting access by the recipient to the SDD-related data according to a data control rule received from the sender.

14. A system for providing digital data associated with a tangible delivery item that is sent from a sender to a recipient, the system comprising:

one or more processor; and an interface that is operatively coupled to the one or more processor, wherein the interface is configured to receive, from the sender, data comprising:

conventional delivery item transmittal data comprising sender identification data for the tangible delivery item and recipient identification data for the tangible delivery item; and supporting digital data (SDD) that is distinct from the conventional delivery item transmittal data and that is lacking information identifying the recipient; and wherein the one or more processor is configured to perform operations comprising:

transmitting, to a processing device of a delivery service, the conventional delivery item transmittal data and SDD-related data, wherein the delivery service is configured to associate the tangible delivery item with the SDD and to inform the recipient about the SDD based on the SDD-related data;

generating an image of an indicia with encoded data comprising:

the conventional delivery item transmittal data; and the SDD-related data; and providing the image of the indicia for application to an exterior surface of the tangible delivery item;

wherein the image of the indicia is configured to be imaged during sorting of the tangible delivery item.

15. The system of claim 14, wherein the SDD-related data comprises at least one of:

a full contents of the SDD;

text data from the SDD;

a digital file from the SDD;

a link enabling digital access from an electronic device of the recipient to a storage location of the SDD;

an index indicative of at least a portion of the SDD;

an identifier indicating a type of data in the SDD; or an identifier indicating a type of service associated with the SDD.

16. The system of claim 14, wherein the SDD comprises at least one of:

text for reading by the recipient;

an audio message for hearing by the recipient;

a graphic for electronic viewing by the recipient;

an executable program for execution by an electronic device of the recipient;

an electronic document for access by the recipient; or a link to a remote digital resource for access by the recipient.

17. The system of claim 14, wherein the one or more processor is further configured to perform operations comprising:

storing the SDD in a memory; and enabling the recipient to access the SDD.

18. The system of claim 17, wherein the one or more processor is further configured to perform operations comprising at least one of:

transmitting to the processing device of the delivery service a link to the stored SDD; or including in the indicia a link to the stored SDD.

19. The system of claim 14, wherein the interface is configured to receive, from the sender, data comprising a control rule that includes a limitation on the use of the SDD by the recipient.

20. The system of claim 19, wherein a number of uses by the recipient of the SDD is limited according to the control rule.

\*    \*    \*    \*    \*